US012785372B2

(12) United States Patent
Kiyota et al.

(10) Patent No.: US 12,785,372 B2
(45) Date of Patent: Nov. 3, 2026

(54) ELECTRICAL CONNECTION BOX

(71) Applicant: YAZAKI CORPORATION, Tokyo (JP)

(72) Inventors: Hirotaka Kiyota, Makinohara (JP); Takeshi Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 190 days.

(21) Appl. No.: 18/976,334

(22) Filed: Dec. 11, 2024

(65) Prior Publication Data

US 2025/0105606 A1 Mar. 27, 2025

Related U.S. Application Data

(63) Continuation of application No. PCT/JP2023/037615, filed on Oct. 18, 2023.

(30) Foreign Application Priority Data

Nov. 24, 2022 (JP) ................................ 2022-187139

(51) Int. Cl.

| | |
|---|---|
| ***B60R 16/023*** | (2006.01) |
| ***H02G 3/08*** | (2006.01) |
| ***H02G 3/14*** | (2006.01) |
| ***H02G 3/16*** | (2006.01) |

(52) U.S. Cl.

CPC ........... *H02G 3/16* (2013.01); *B60R 16/0239* (2013.01); *H02G 3/088* (2013.01); *H02G 3/14* (2013.01)

(58) Field of Classification Search

CPC .................................................. B60R 16/0239

See application file for complete search history.

(56) References Cited

U.S. PATENT DOCUMENTS

| | | | | |
|---|---|---|---|---|
| 2005/0011658 A1* | 1/2005 | Oda | B60R 16/0238 | 174/50 |
| 2005/0087355 A1* | 4/2005 | Ikeda | B60R 16/0238 | 174/50 |
| 2007/0167040 A1* | 7/2007 | Ogawa | H01R 13/6599 | 439/76.2 |
| 2018/0309278 A1* | 10/2018 | Ikeda | B60R 16/0238 | |
| 2021/0175697 A1* | 6/2021 | Tashiro | B60R 16/0239 | |

FOREIGN PATENT DOCUMENTS

JP 2014-93888 A 5/2014

* cited by examiner

*Primary Examiner* — Hung V Ngo

(74) *Attorney, Agent, or Firm* — KENEALY VAIDYA LLP

(57) ABSTRACT

An electrical connection box includes a circuit branching component disposed outside the frame and outside a tubular portion, in which the tubular wall of the tubular portion has a notch through which a second electrical connection portion of an internal conductive member protrudes toward the outside of the frame outside the tubular portion, and a block includes a protruding block portion that protrudes toward the outside of the tubular portion through the notch, and a notch closing portion that closes the notch.

10 Claims, 16 Drawing Sheets

ELECTRICAL CONNECTION BOX

CROSS-REFERENCE TO RELATED APPLICATION(S)

This application is a continuation application of International Application PCT/JP2023/037615, filed on Oct. 18, 2023 which claims the benefit of priority from Japanese Patent Application No. 2022-187139 filed on Nov. 24, 2022 and designating the U.S., the entire contents of which are incorporated herein by reference.

BACKGROUND OF THE INVENTION

1. Field of the Invention

The present invention relates to an electrical connection box.

2. Description of the Related Art

In an electrical connection box, an electronic component such as a relay interposed between an external power supply and a load is housed in a housing. In the electrical connection box, an electric wire electrically connected to the electronic component is routed in the housing, and the electric wire is drawn out of the housing to be electrically connected to the power supply or load. For example, the electrical connection box according to the related art is disclosed in Japanese Patent Application Laid-open No. 2014-93888 below.

Meanwhile, in recent vehicles, there is increasing adoption of electric wires that are difficult to bend, such as an electric wire that has a larger diameter to change a material of a core wire of the electric wire for weight reduction, or an electric wire that has a larger diameter for a large current. For this reason, in the electrical connection box, it is difficult to route the electric wire in a narrow space in the housing, and there is a possibility that an overload is applied to the periphery from the electric wire in the housing. In the electrical connection box, for example, it is possible to suppress an overload in the housing due to the electric wire by disposing such an electric wire and a component connected to the electric wire outside the housing. On the other hand, in such an electrical connection box, it is necessary to electrically connect the component outside the housing and a component inside the housing with a conductive member. Therefore, in such an electrical connection box, it is necessary to provide an insertion passage (a notch, a through-hole, or the like) for arranging the conductive member over the inside and the outside of the housing, and how to suppress infiltration of water into the housing through the insertion passage becomes the next problem.

SUMMARY OF THE INVENTION

Therefore, an object of the present invention is to provide an electrical connection box that can ensure waterproofness while suppressing an overload in a housing.

The present invention includes an electronic component; an internal conductive member that electrically connects the electronic component to an external power supply; a block that holds the electronic component and the internal conductive member; a frame that includes a tubular portion that houses and holds the block in the tubular portion and includes a tubular wall having openings at both ends, and is installed such that one of the openings of the tubular portion faces vertically upward; a first cover member that is fitted to a first opening peripheral edge portion of a peripheral edge of the one opening of the tubular portion and closes the one opening of the tubular portion; a second cover member that is fitted to a second opening peripheral edge portion of a peripheral edge of the other opening of the tubular portion and closes the other opening of the tubular portion; and a circuit branching component that is disposed outside the frame and outside the tubular portion and is interposed between the external power supply and an external load, wherein the internal conductive member includes a first electrical connection portion and a second electrical connection portion that are physically and electrically connected to the electronic component in the tubular portion, the circuit branching component includes a power supply connection portion that is disposed outside the frame and outside the tubular portion and is physically and electrically connected to a power-supply-side terminal fitting of a terminal of a power-supply-side electric wire electrically connected to the external power supply and the second electrical connection portion of the internal conductive member, and a load connection portion that is electrically connected to a load-side electric wire electrically connected to the external load, the tubular wall of the tubular portion has a notch through which an inside and an outside of the tubular portion communicate with each other and the second electrical connection portion of the internal conductive member protrudes toward an outside of the frame outside the tubular portion, the block includes a protruding block portion that protrudes from the notch toward the outside of the tubular portion, and a notch closing portion that closes the notch, a power-supply-side electrical connection structure that is held by the protruding block portion and physically and electrically connects the power-supply-side terminal fitting of the terminal of the power-supply-side electric wire, the second electrical connection portion of the internal conductive member, and the power supply connection portion of the circuit branching component to each other at a position protruding from an end surface of the protruding block portion that is adjacent to the first opening peripheral edge portion is provided outside the frame and outside the tubular portion, and a gap formed between a peripheral edge portion of the notch that is adjacent to the first opening peripheral edge portion in the tubular wall of the tubular portion and an end portion of the notch closing portion that is adjacent to the first opening peripheral edge portion is provided more adjacent to the second opening peripheral edge portion than the end surface of the protruding block portion in a tube axis direction of the tubular portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an electrical connection box according to the present invention will be described in detail with reference to the drawings. Note that the present invention is not limited by the embodiment.

EMBODIMENT

One embodiment of an electrical connection box according to the present invention will be described with reference to FIGS. 1 to 16.

Figure 1:
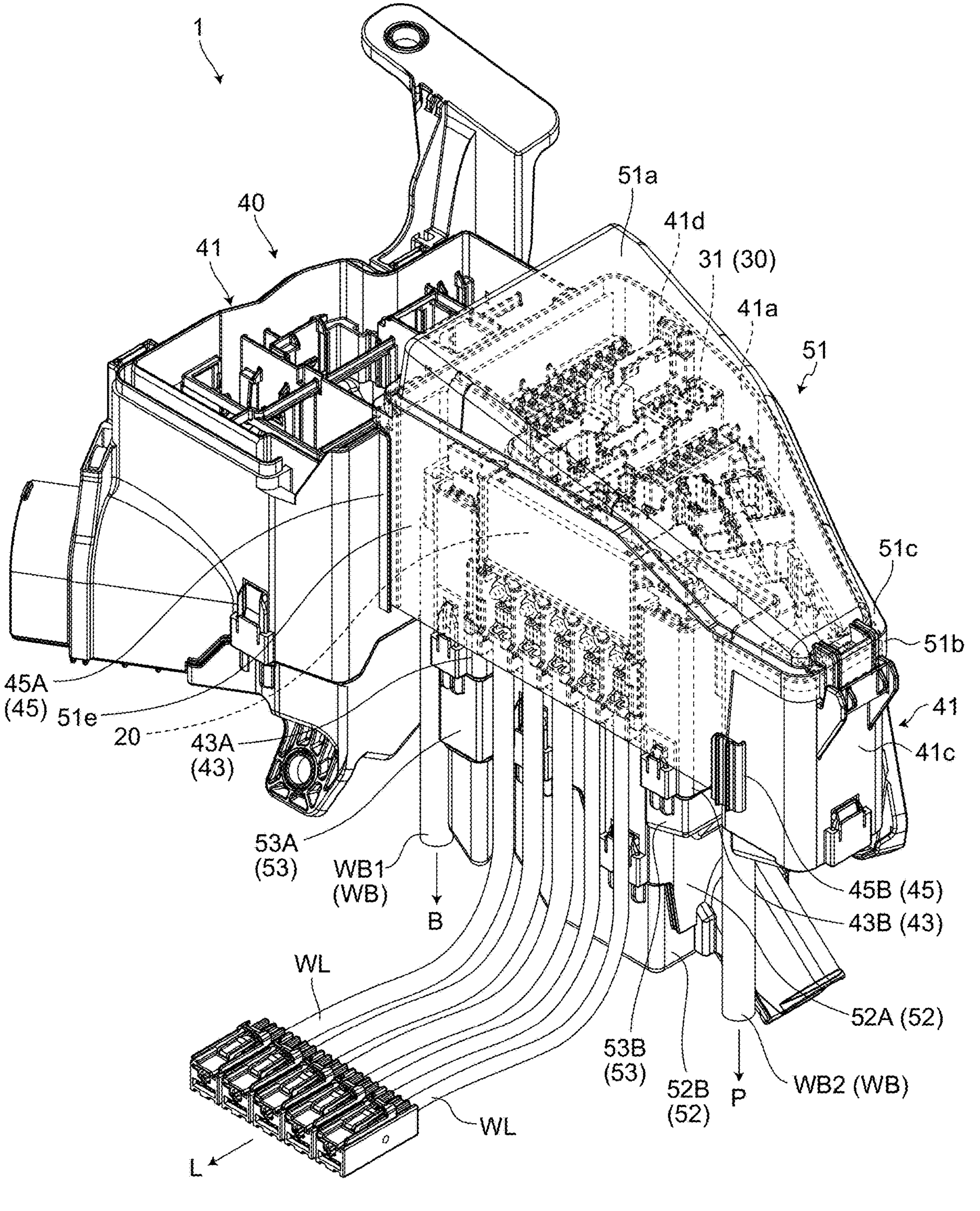
FIG. 1 is a perspective view illustrating an electrical connection box according to an embodiment.

Reference Numeral 1 illustrated in FIGS. 1 to 7 indicates the electrical connection box according to the present embodiment. An electrical connection box 1 is mounted on a vehicle such as an automobile, and is interposed between an external power supply B such as a secondary battery in the vehicle and an external load L such as a power distribution target (for example, auxiliary devices to be subjected to power supply) to supply power of the external power supply B to the external load L (FIG. 1).

The electrical connection box 1 includes an electronic component 10 such as a relay or a fuse (FIG. 2), and the electronic component 10 is interposed between the external power supply B and the external load L. Further, the electrical connection box 1 includes a circuit branching component 20 interposed between the external power supply B and the external load L (FIGS. 1 to 7). The circuit branching component 20 is a component for distributing power from the external power supply B to a plurality of external loads L. The electrical connection box 1 includes a plurality of electronic components 10 and at least one circuit branching component 20.

The electrical connection box 1 includes a block 30 that holds the electronic component 10 and a frame 40 including a tubular portion 41 that houses and holds the block 30 therein and includes a tubular wall 41*c* having openings (openings 41*a* and 41*b*) at both ends (FIGS. 1 to 9). The electrical connection box 1 includes a cover member (hereinafter, referred to as a "first cover member") 51 that is fitted to a peripheral edge portion (hereinafter, referred to as a "first opening peripheral edge portion") 41*d* of a peripheral edge of one opening 41*a* of the tubular portion 41 and closes the one opening 41*a* of the tubular portion 41, and a cover member (hereinafter, referred to as a "second cover member") 52 that is fitted to a peripheral edge portion (hereinafter, referred to as a "second opening peripheral edge portion") 41*e* of a peripheral edge of the other opening 41*b* of the tubular portion 41 and closes the other opening 41*b* of the tubular portion 41 (FIGS. 1, 2, 5, 7, 9, and 10). The block 30, the frame 40, the first cover member 51, and the second cover member 52 are formed of an insulating material such as a synthetic resin.

In the electrical connection box 1, a housing is formed by the frame 40, the first cover member 51, and the second cover member 52, and an electric wire (not illustrated) electrically connected to the electronic component 10 is routed in the housing and drawn out from an opening to the outside of the housing.

In the frame 40, the block 30 is inserted into the tubular portion 41 through the other opening 41*b*. In a case where the frame 40 is implemented by one tubular portion 41, the entire outer wall forming an outer frame is formed by the tubular wall 41*c* of the tubular portion 41. In addition, in a case where the frame 40 is implemented by a combination of a plurality of tubular portions 41 with the one openings 41*a* having the same opening direction and the other openings 41*b* having the same opening direction, the outer wall forming the outer frame is formed by a combination of parts of the tubular walls 41*c* of the plurality of tubular portions 41. That is, the outer wall forming the outer frame of the frame 40 is entirely or partially formed by the tubular wall 41*c* of the tubular portion 41.

The frame 40 is installed with the one opening 41*a* of the tubular portion 41 facing vertically upward. The frame 40 illustrated here is a combination of two tubular portions 41, and is mounted on the vehicle with the one opening 41*a* facing an upper side of the vehicle. The first cover member 51 illustrated here is provided for each of the tubular portions 41. In addition, the second cover member 52 illustrated here is divided into a first divided cover 52A and a second divided cover 52B assembled with each other, and closes the other opening 41*b* of each of the two tubular portions 41 in a form in which the first divided cover 52A and the second divided cover 52B are assembled (FIGS. 1, 2, 7, and 9).

Figure 6:
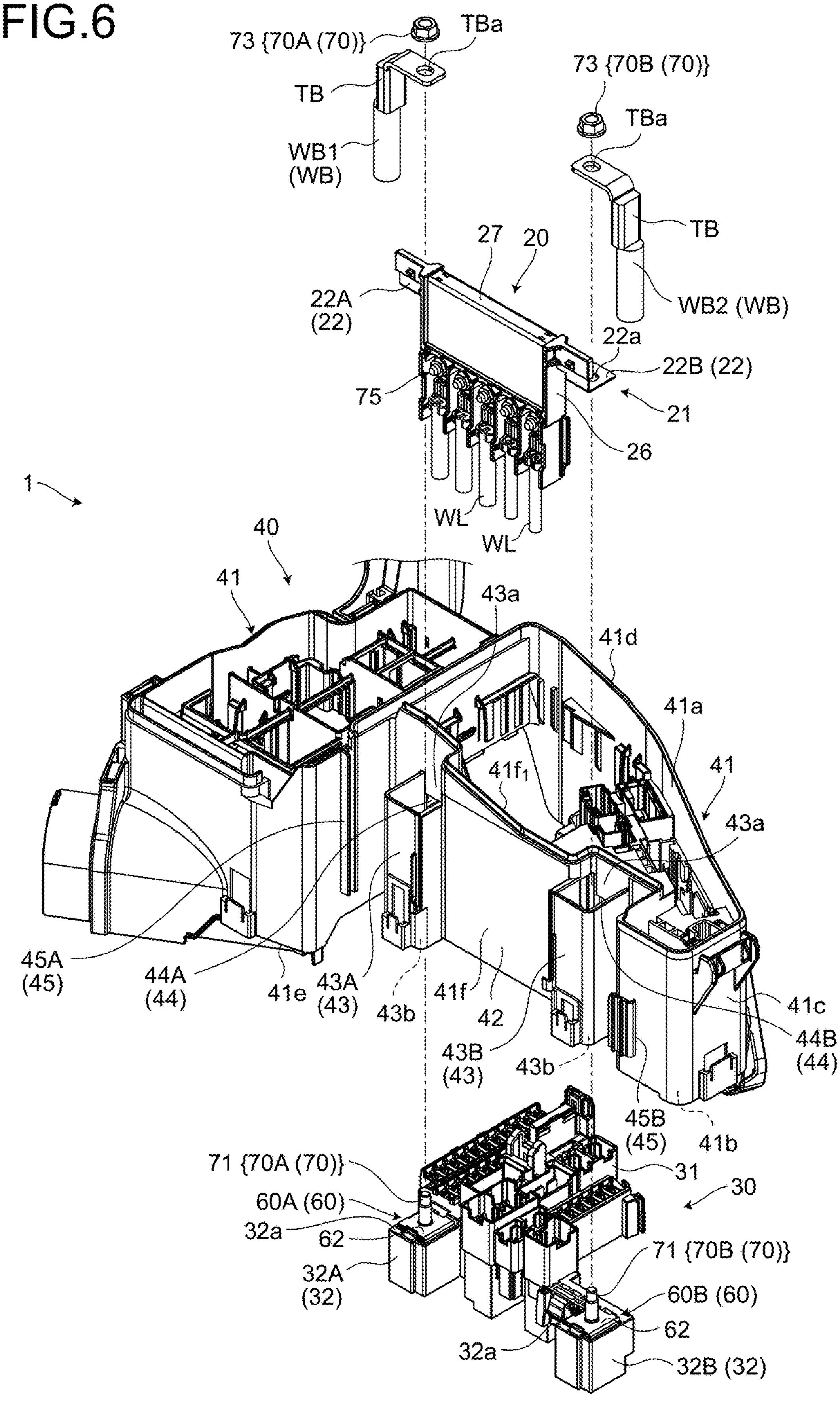
FIG. 6 is an exploded perspective view illustrating the electrical connection box (without the first cover member and a second cover member) according to the embodiment.
Figure 8:
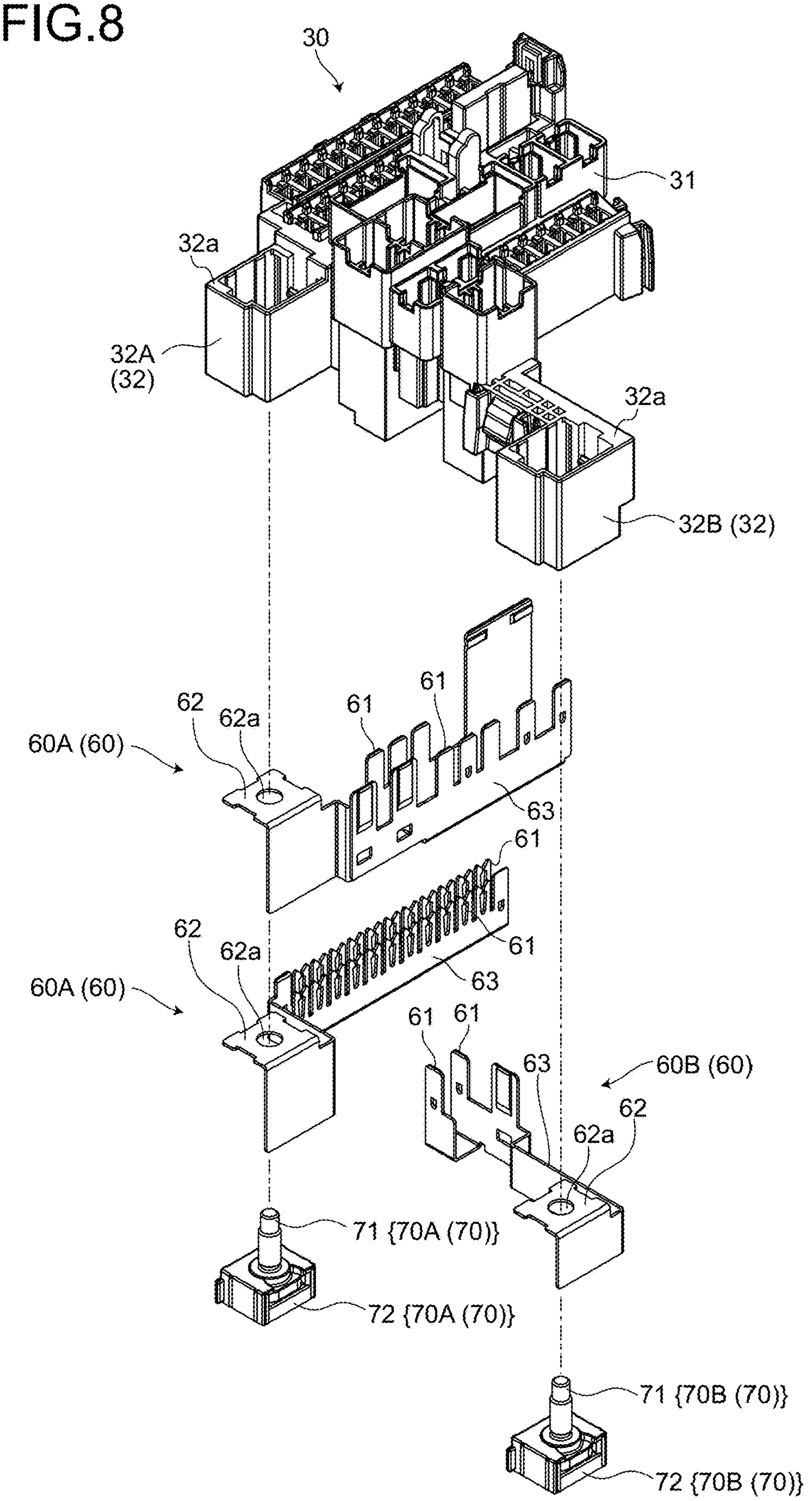
FIG. 8 is an exploded perspective view illustrating a block, and an internal conductive member and a male screw member housed in the block.
Figure 9:
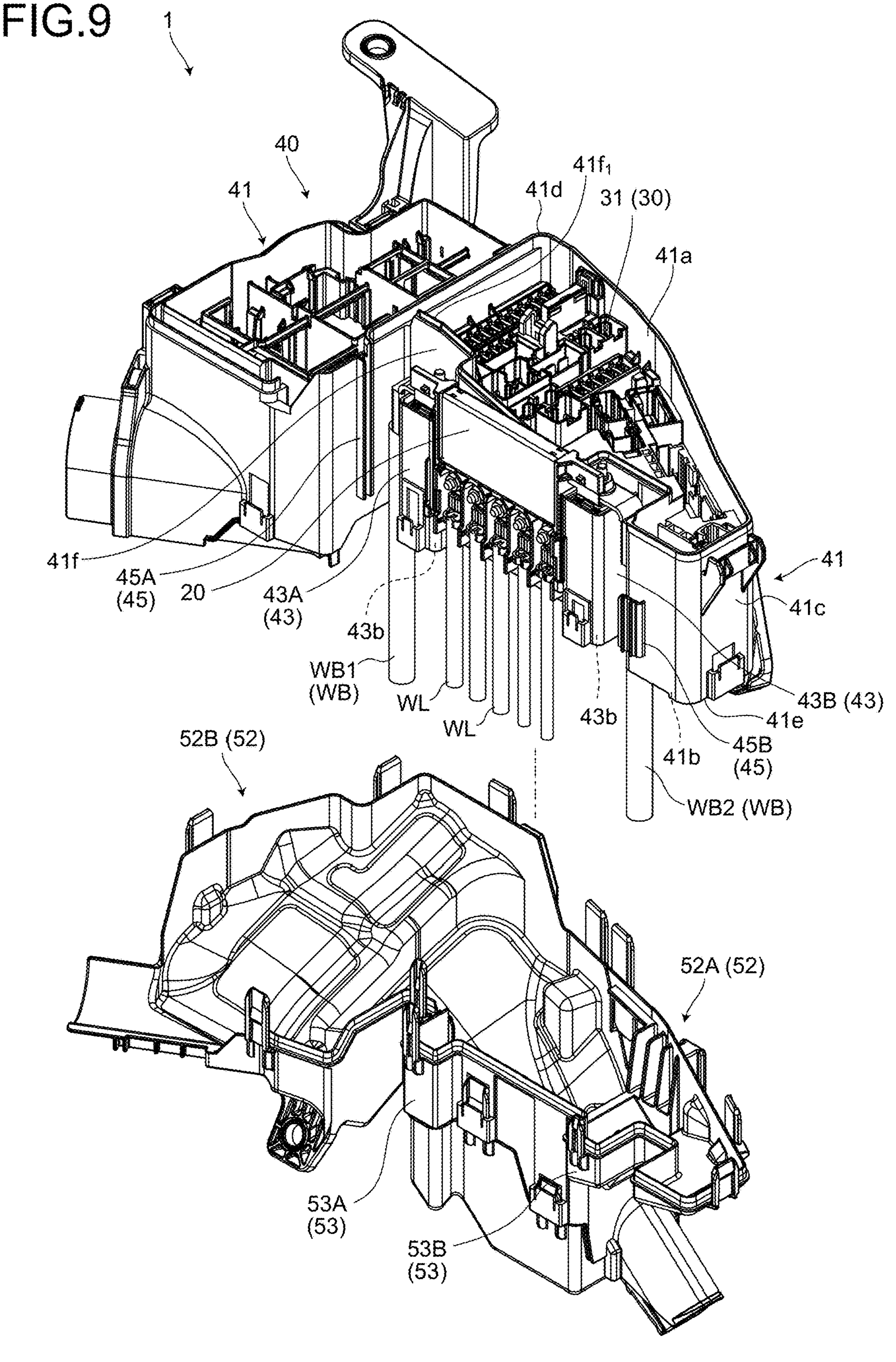
FIG. 9 is an exploded perspective view of the frame and the second cover member in the electrical connection box (without the first cover member) according to the embodiment.

The electrical connection box 1 includes an internal conductive member 60 that electrically connects the electronic component 10 to the external power supply B and is held by the block 30 together with the electronic component 10 (FIGS. 6 and 8). The internal conductive member 60 includes a first electrical connection portion 61 that is physically and electrically connected to the electronic component 10 in the tubular portion 41 (FIG. 8). The first electrical connection portion 61 is provided for each electronic component 10. In addition, the internal conductive member 60 includes a second electrical connection portion 62 electrically connected to the external power supply B (FIGS. 6 and 8). In the internal conductive member 60, the plurality of first electrical connection portions 61 and the second electrical connection portion 62 are connected by a coupling portion 63 (FIG. 8). The internal conductive member 60 has a shape in which the coupling portion 63 extends to the outside of the tubular portion 41, and the second electrical connection portion 62 is coupled to an end of the coupling portion 63 that extends outside the frame 40. That is, the second electrical connection portion 62 is disposed outside the frame 40 and outside the tubular portion 41.

The internal conductive member 60 is a so-called bus bar, and is formed in a plate shape using a metal plate as a base material, for example. The block 30 includes a block body 31 that holds the electronic component 10 and the internal conductive member 60 in the tubular portion 41 (FIGS. 1 and 4 to 9).

The circuit branching component 20 is disposed outside the frame 40 and outside the tubular portion 41. The circuit branching component 20 includes a conductive circuit branching member 21 interposed between the external power supply B and the external load L (FIGS. 4, 6, 11, and 12).

Here, the circuit branching component 20 includes at least a power supply connection portion 22 and a load connection portion 23 described below. The circuit branching component 20 includes a coupling portion 25 described below that electrically connects the power supply connection portion 22 and a plurality of load connection portions 23. However, the circuit branching component 20 illustrated here includes, in addition to the power supply connection portion 22 and the load connection portion 23, a fusible portion 24 described below for cutting off an overcurrent between the external power supply B and the external load L, and accordingly, includes the coupling portion 25 described below. That is, here, as an example of the circuit branching component 20, a circuit protection component for cutting off an overcurrent between the external power supply B and the external load L is exemplified. Therefore, the circuit branching component (circuit protection component) 20 illustrated here includes a conductive circuit protection member interposed between the external power supply B and the external load L as the circuit branching member 21.

The circuit branching member (circuit protection member) 21 is disposed outside the frame 40 and outside the tubular portion 41, and includes the power supply connection portion 22 that is physically and electrically connected to a power-supply-side terminal fitting T of a terminal of a power-supply-side electric wire WB electrically connected to the external power supply B and the second electrical connection portion 62 of the internal conductive member 60 (FIGS. 2 to 6, 11, and 12).

Figure 11:
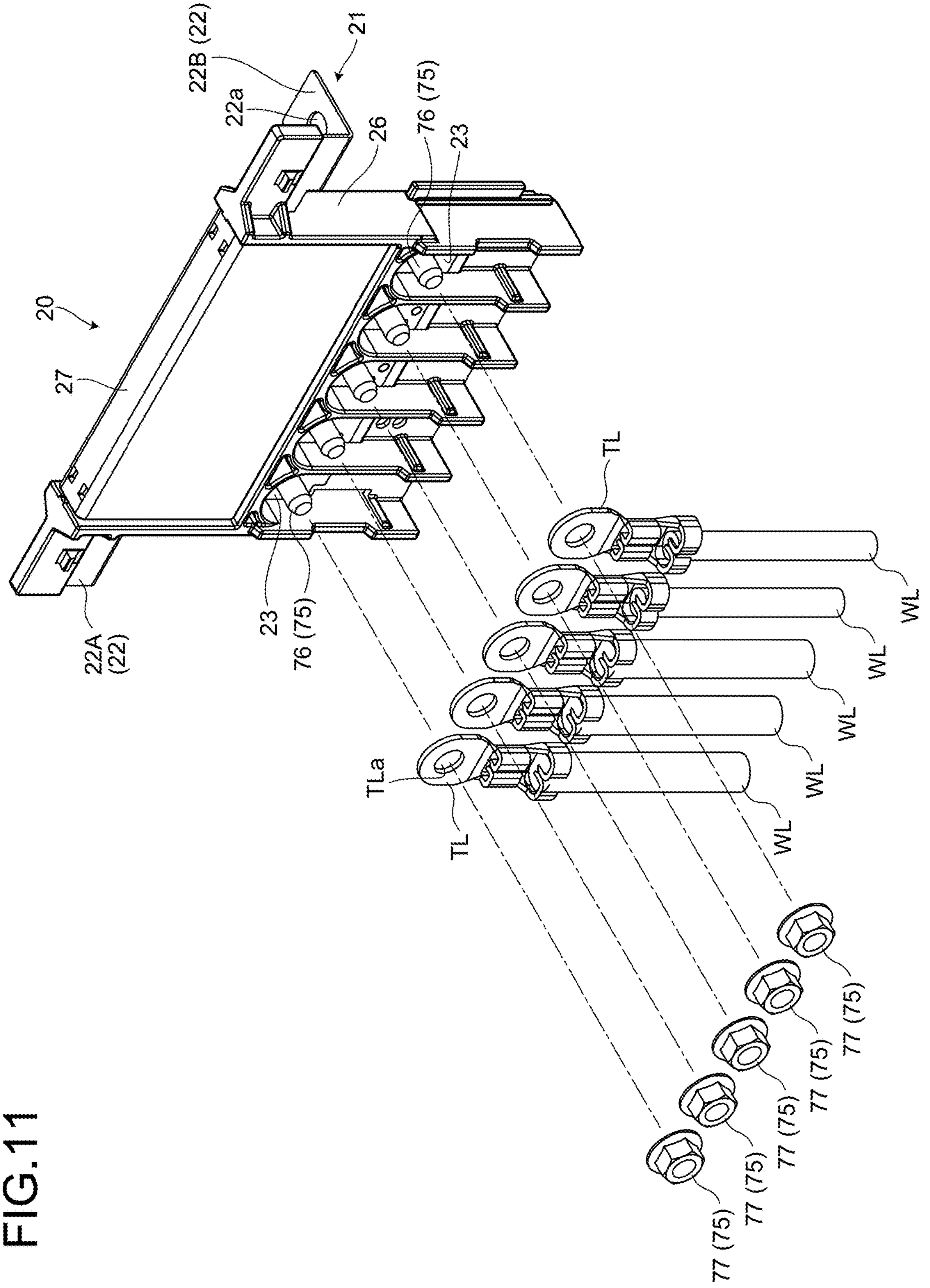
FIG. 11 is an exploded perspective view illustrating a load-side electrical connection structure.
Figure 12:
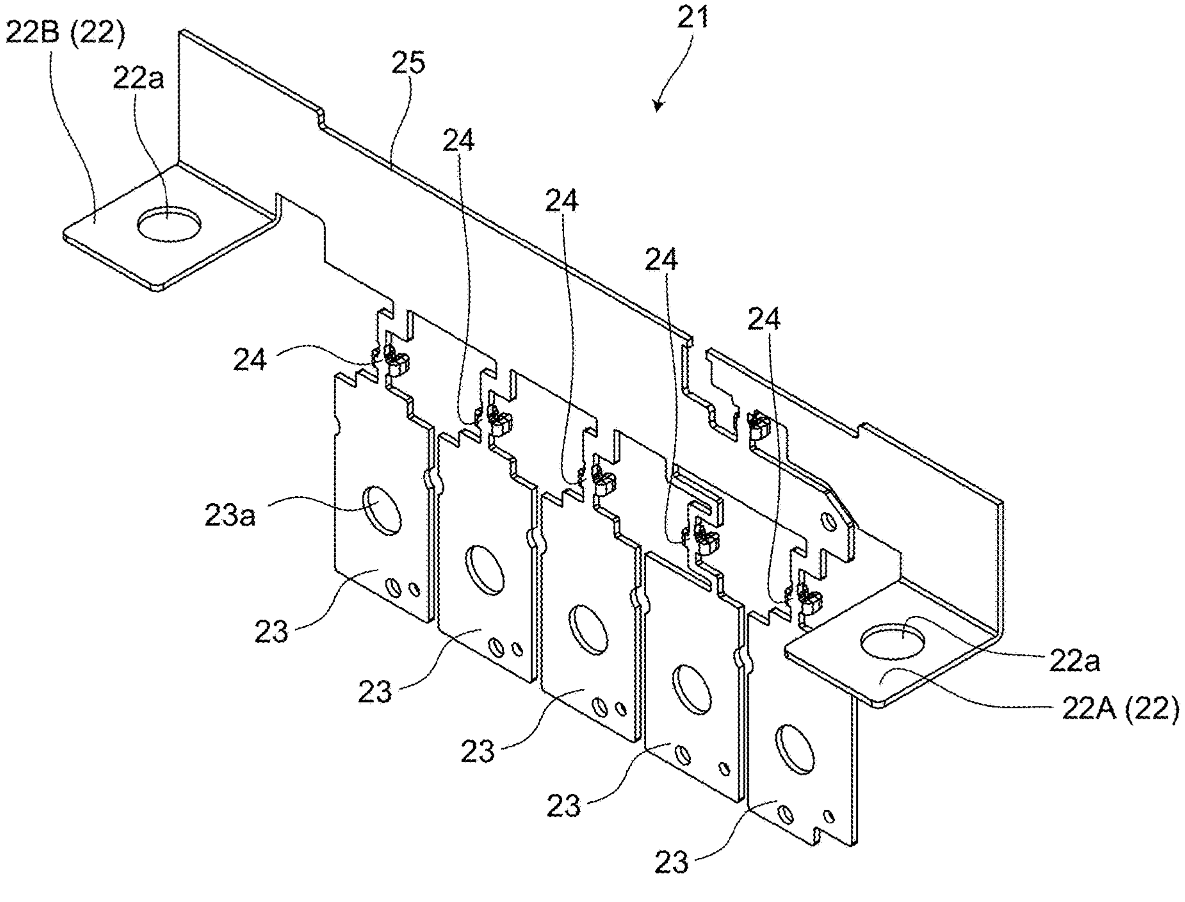
FIG. 12 is a perspective view illustrating a circuit protection member.

In addition, the circuit branching member (circuit protection member) 21 includes the load connection portion 23 that is disposed outside the frame 40 and outside the tubular portion 41 and is electrically connected to a load-side electric wire WL electrically connected to the external load L, and the fusible portion 24 that is interposed between the power supply connection portion 22 and the load connection portion 23 and is fused when an overcurrent flows (FIGS. 11 and 12). In the circuit branching member (circuit protection member) 21, the load connection portion 23 and the fusible portion 24 are provided for each external load L. The circuit branching member (circuit protection member) 21 includes the coupling portion 25 that couples the power supply connection portion 22 and the fusible portion 24 (FIG. 12). The power supply connection portion 22 and the fusible portion 24 for each external load L are connected to the coupling portion 25.

The circuit branching member (circuit protection member) 21 is a so-called bus bar, and is formed in a plate shape using a metal plate as a base material, for example. In the circuit branching component (circuit protection component) 20, a resin portion 26 is integrally formed with the circuit branching member (circuit protection member) 21 by using a synthetic resin material in a state where the power supply connection portion 22, the load connection portion 23, and the fusible portion 24 are exposed (FIGS. 6 and 11). Then, in the circuit branching component (circuit protection component) 20, a transparent resin cover 27 that is made of a synthetic resin material and covers the exposed fusible portion 24 is assembled to the resin portion 26 (FIGS. 6 and 11).

In the circuit branching component (circuit protection component) 20, the power supply connection portion 22 is disposed closer to the first opening peripheral edge portion 41*d* than the load connection portion 23 in a tube axis direction of the tubular portion 41 (FIGS. 6 and 11).

The electrical connection box 1 includes a power-supply-side electrical connection structure 70 that physically and electrically connects the power-supply-side terminal fitting TB of the terminal of the power-supply-side electric wire WB, the second electrical connection portion 62 of the internal conductive member 60, and the power supply connection portion 22 of the circuit branching member (circuit protection member) 21 to each other (FIGS. 3 to 6 and 8). The power-supply-side electrical connection structure 70 is disposed outside the frame 40 and outside the tubular portion 41. Therefore, the power-supply-side electrical connection structure 70 physically and electrically connects the power-supply-side terminal fitting TB of the terminal of the power-supply-side electric wire WB, the second electrical connection portion 62 of the internal conductive member 60, and the power supply connection portion 22 of the circuit branching member (circuit protection member) 21 outside the frame 40.

Figure 4:
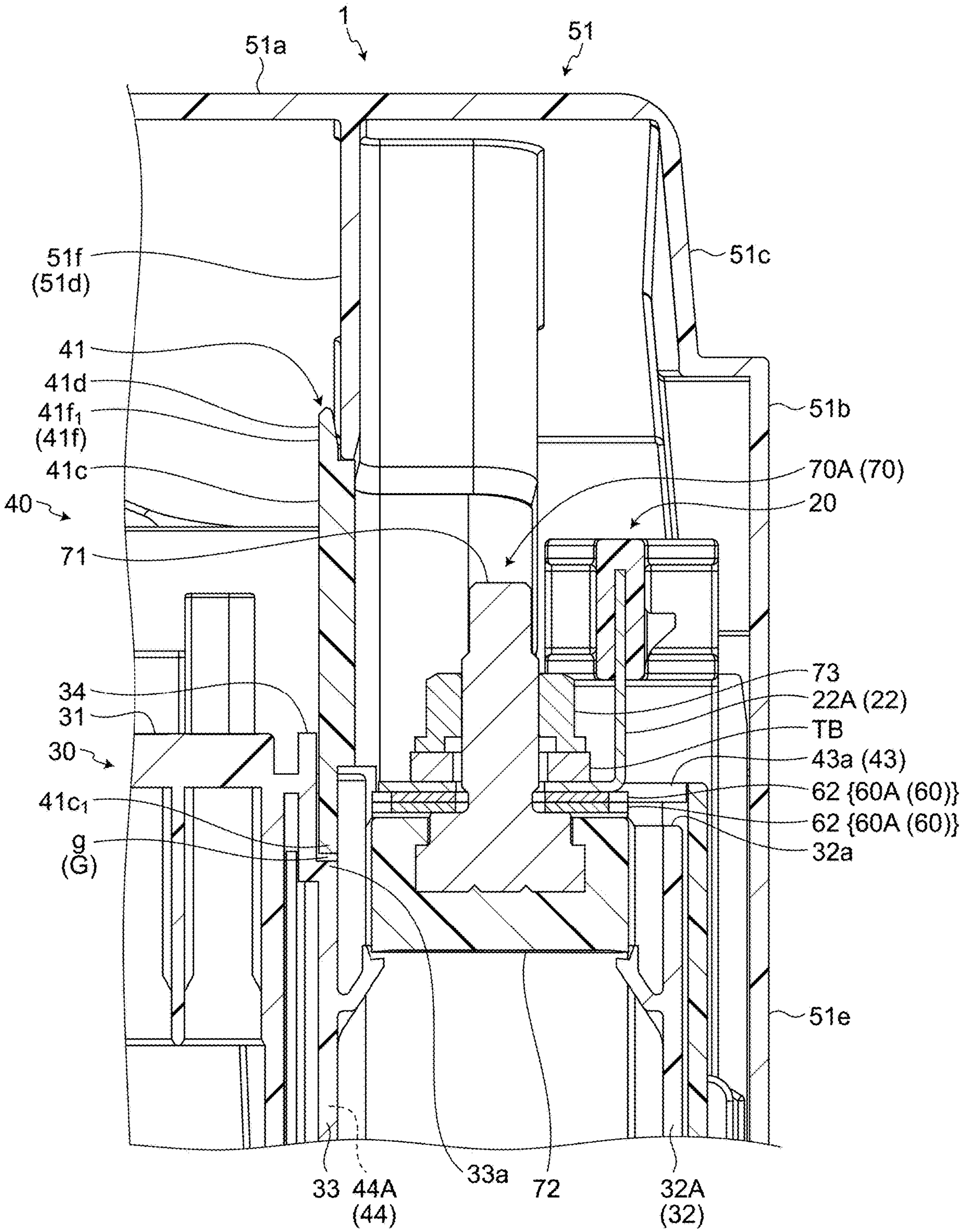
FIG. 4 is a cross-sectional view taken along line X-X of FIG. 2.

The power-supply-side electrical connection structure 70 illustrated here includes a male screw member 71, a screw holding member 72 that holds the male screw member 71 in a state where a male screw portion is exposed, and a female screw member 73 to be screwed to the male screw portion of the male screw member 71 (FIGS. 4, 6, and 8). In the power-supply-side electrical connection structure 70, the male screw portion of the male screw member 71 is inserted into through-holes TBa, 62*a*, and 22*a* provided in the power-supply-side terminal fitting TB, the second electrical connection portion 62 of the internal conductive member 60, and the power supply connection portion 22 of the circuit branching member (circuit protection member) 21, respectively, and the female screw member 73 is screwed to the male screw portion, whereby the power-supply-side terminal fitting TB, the second electrical connection portion 62 of the internal conductive member 60, and the power supply connection portion 22 of the circuit branching member (circuit protection member) 21 are fastened and fixed together (FIGS. 6 and 8).

Here, in the power-supply-side electrical connection structure 70, the male screw member 71 is disposed such that a screw axis of the male screw portion is aligned with a vertical direction (that is, a top-bottom direction of the vehicle) and the male screw portion protrudes from the screw holding member 72 vertically upward (that is, toward the upper side of the vehicle).

Figure 2:
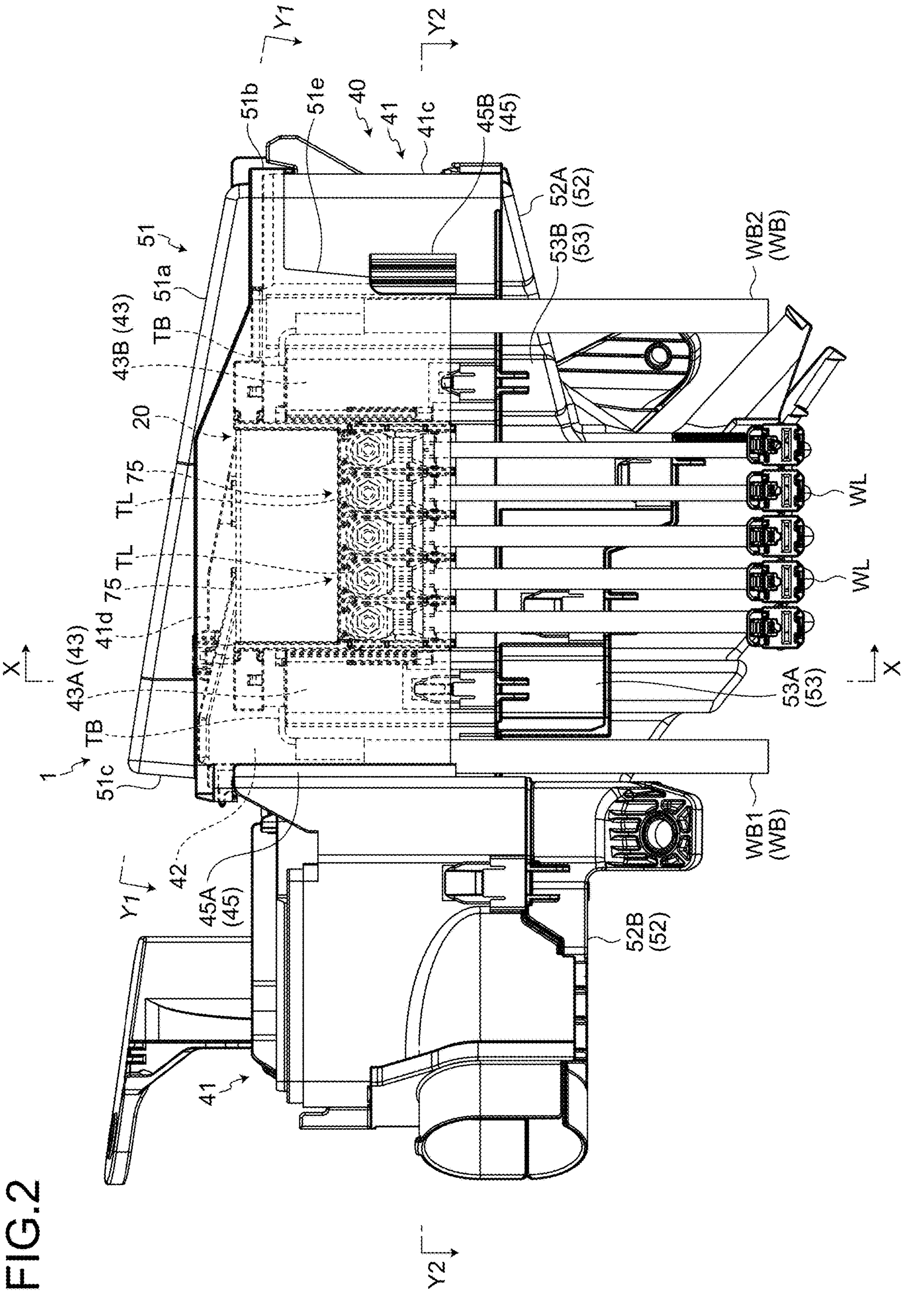
FIG. 2 is a plan view of the electrical connection box according to the embodiment when viewed from a side of a frame.
Figure 3:
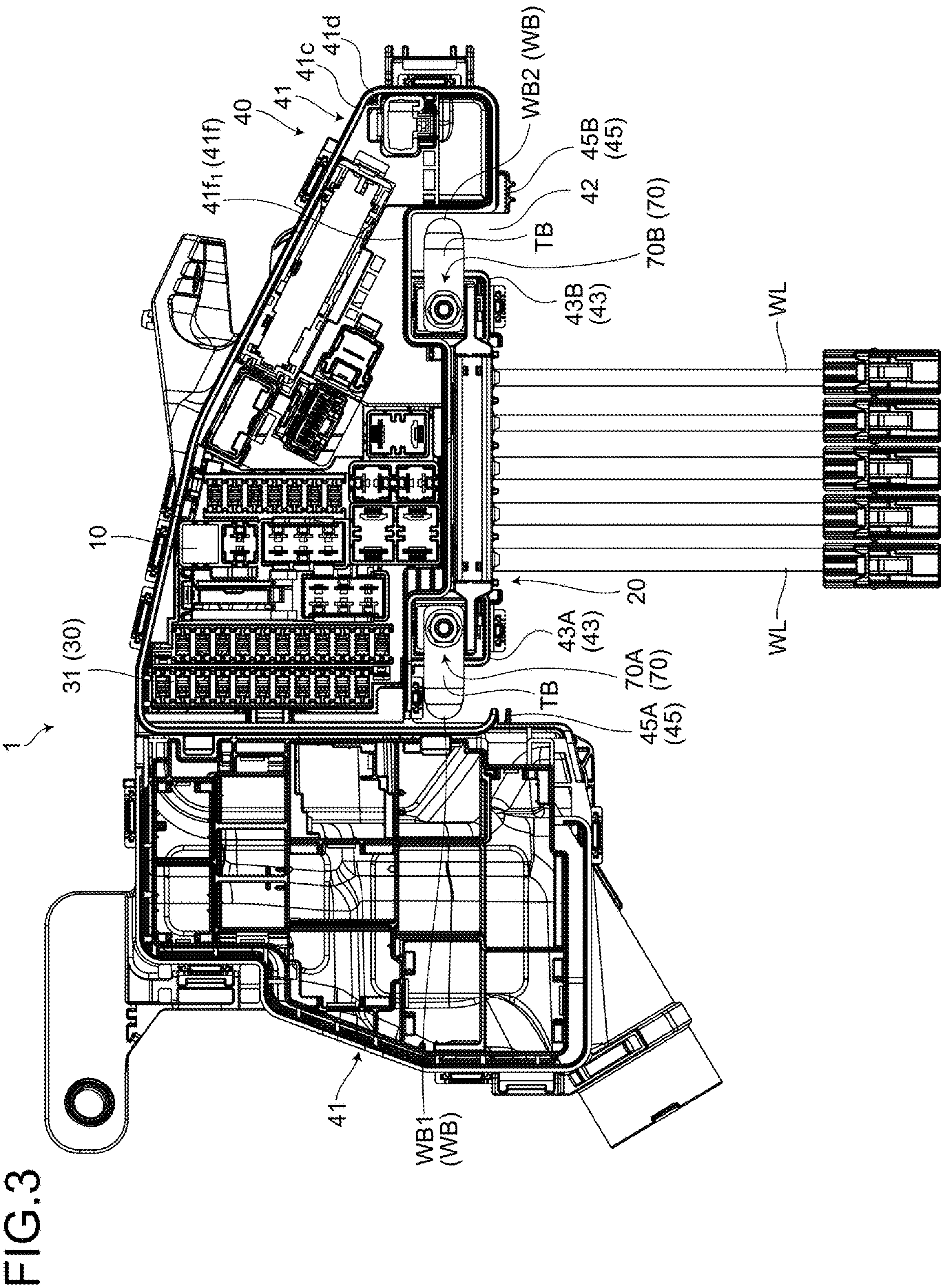
FIG. 3 is a plan view of the electrical connection box (without a first cover member) according to the embodiment when viewed from one opening side of the frame.

In addition, the electrical connection box 1 includes a load-side electrical connection structure 75 that electrically connects the load-side electric wire WL and the load connection portion 23 of the circuit branching member (circuit protection member) 21 to each other (FIGS. 2, 6, and 11). A load-side terminal fitting TL is attached to a terminal of the load-side electric wire WL (FIGS. 2 and 11). Therefore, the load-side electrical connection structure 75 physically and electrically connects the load-side terminal fitting TL and the load connection portion 23 of the circuit branching member (circuit protection member) 21 to each other.

The load-side electrical connection structure 75 illustrated here includes a male screw member 76 and a female screw member 77 to be screwed to a male screw portion of the male screw member 76 (FIG. 11). The resin portion 26 is integrally formed with the male screw member 76 in a state where the male screw portion of the male screw member 76 is inserted into a through-hole 23*a* (FIG. 12) of the load connection portion 23 of the circuit branching member (circuit protection member) 21 and the male screw portion is exposed. In the load-side electrical connection structure 75, the male screw portion of the male screw member 76 is inserted into a through-hole TLa provided in the load-side terminal fitting TL, and the female screw member 77 is screwed to the male screw portion, whereby the load-side terminal fitting TL and the load connection portion 23 of the circuit branching member (circuit protection member) 21 are fastened and fixed together (FIG. 11).

Here, in the load-side electrical connection structure 75, the male screw member 76 is disposed such that the male screw portion protrudes toward a side opposite to the tubular wall 41*c* of the tubular portion 41. In this example, the male screw member 76 is disposed such that a screw axis of the male screw portion is aligned with a direction orthogonal to the vertical direction (that is, the top-bottom direction of the vehicle), and the male screw portion protrudes toward the side opposite to the tubular wall 41*c* of the tubular portion 41.

Specifically, the circuit branching component (circuit protection component) 20 is disposed outside the frame 40 as follows.

The frame 40 has a recess 42 which is a portion of the outer wall forming the outer frame that is recessed toward the inside of the tubular portion 41 and in which the circuit branching component (circuit protection component) 20 is disposed (FIGS. 2, 3, 5, 6, and 13). The recess 42 desirably has a volume equal to or larger than a size of the circuit branching component (circuit protection component) 20 and can house the circuit branching component (circuit protection component) 20 such that the circuit branching component (circuit protection component) 20 does not protrude. For example, the tubular wall 41*c* of the tubular portion 41 has a facing wall body 41*f* disposed to face the circuit branching component (circuit protection component) 20 outside the tubular portion 41. The recess 42 is formed by making the facing wall body 41*f* be recessed toward the inside of the tubular portion 41.

In addition, the frame 40 includes a sub tubular portion 43 outside the frame 40 and outside the tubular portion 41 (FIGS. 1 to 6, 9, and 13). The sub tubular portion 43 is a tubular portion having openings (openings 43*a* and 43*b*) at both ends and having a shape bulging from the tubular wall 41*c* of the tubular portion 41 toward the outside of the frame 40 outside the tubular portion 41. In the sub tubular portion 43, one opening 43*a* is disposed adjacent to the one opening 41*a* (that is, the first opening peripheral edge portion 41*d*) of the tubular portion 41, and the other opening 43*b* is disposed adjacent to the other opening 41*b* (that is, the second opening peripheral edge portion 41*e*) of the tubular portion 41. Here, the sub tubular portion 43 having openings (openings 43*a* and 43*b*) at both ends and bulging from the facing wall body 41*f* toward the outside of the frame 40 outside the tubular portion 41 is formed. The sub tubular portion 43 is provided in the recess 42 of the frame 40.

Figure 13:
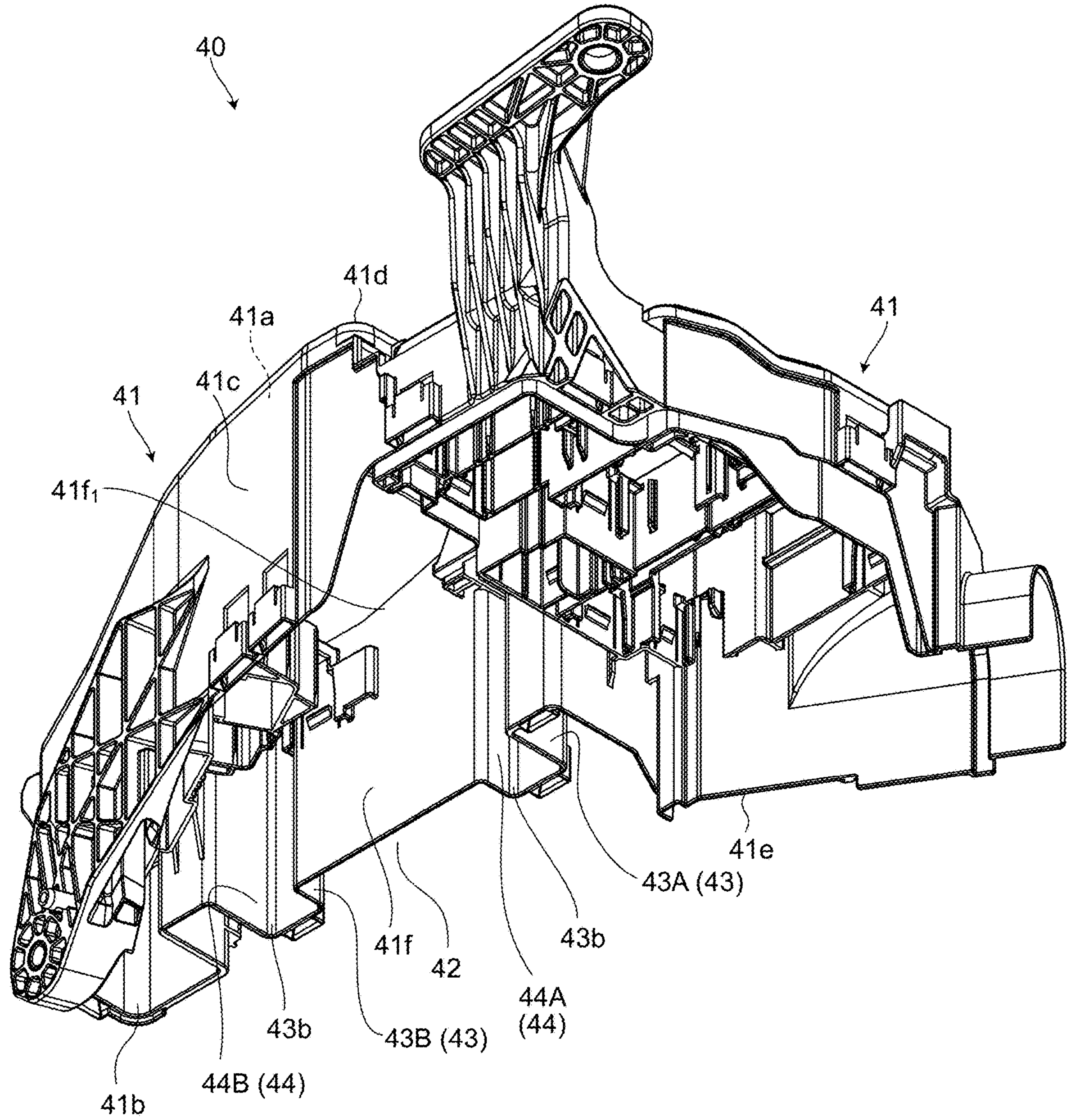
FIG. 13 is a perspective view illustrating the frame.

The tubular wall 41*c* of the tubular portion 41 has a notch 44 through which the inside and the outside of the tubular wall 41*c* communicate with each other and the second electrical connection portion 62 of the internal conductive member 60 protrudes toward the outside of the frame 40 outside the tubular portion 41 (FIGS. 4, 6, and 13). The notch 44 is formed by cutting the tubular wall 41*c* from the second opening peripheral edge portion 41*e* toward the first opening peripheral edge portion 41*d* in the tube axis direction of the tubular portion 41. Here, the notch 44 is formed in the facing wall body 41*f*. Outside the frame 40, the male screw portion of the male screw member 71 protruding from the screw holding member 72 in the power-supply-side electrical connection structure 70 is inserted into the through-hole 62*a* of the second electrical connection portion 62 protruding toward the outside of the frame 40 through the notch 44.

In addition, the block 30 includes a protruding block portion 32 that protrudes from the notch 44 toward the outside of the tubular portion 41 (FIGS. 4, 6, and 8). The screw holding member 72 is assembled to the protruding block portion 32, whereby the power-supply-side electrical connection structure 70 is held.

The power-supply-side electrical connection structure 70 physically and electrically connects the power-supply-side terminal fitting TB, the second electrical connection portion 62 of the internal conductive member 60, and the power supply connection portion 22 of the circuit branching member (circuit protection member) 21 at a position protruding from an end surface 32*a* of the protruding block portion 32 that is adjacent to the first opening peripheral edge portion 41*d* (FIGS. 4, 6, and 8). Here, the male screw portion of the male screw member 71 protrudes vertically upward (toward the upper side of the vehicle) from the end surface 32*a* of the protruding block portion 32. The power-supply-side terminal fitting TB, the second electrical connection portion 62, and the power supply connection portion 22 are physically and electrically connected to each other by inserting the male screw portion into the respective through-holes TBa, 62*a*, and 22*a* on a side more adjacent to the first opening peripheral edge portion 41*d* than the end surface 32*a* and screwing the female screw member 73 to the male screw portion.

In the electrical connection box 1, in a state where the internal conductive member 60 is held by the block body 31 and the power-supply-side electrical connection structure 70 is held by the protruding block portion 32, the male screw portion of the male screw member 71 of the power-supply-side electrical connection structure 70 is inserted into the through-hole 62*a* of the second electrical connection portion 62 of the internal conductive member 60. In the electrical connection box 1, by inserting the block body 31 holding the internal conductive member 60 into the tubular portion 41 through the other opening 41*b*, the protruding block portion 32 is disposed outside the frame 40 and outside the tubular portion 41 together with the power-supply-side electrical connection structure 70 and the second electrical connection portion 62 of the internal conductive member 60. At the time of the insertion, the block 30 is inserted into the notch 44 together with the internal conductive member 60. That is, in the block 30, there is a portion disposed in the notch 44 at an assembly completion position with respect to the tubular portion 41. Here, the portion is used as a closing portion (hereinafter, referred to as a "notch closing portion") 33 that closes the notch 44 at the assembly completion position (FIG. 4).

Here, at the assembly completion position of the block 30 and the tubular portion 41, a gap G for enabling the assembly and enhancing assembly workability is formed between a peripheral edge portion of the notch 44 in the tubular wall 41*c* of the tubular portion 41 and the notch closing portion 33 (FIG. 4). In the electrical connection box 1, when water hits and bounces off the power-supply-side electrical connection structure 70 on the side more adjacent to the first opening peripheral edge portion 41*d* than the end surface 32*a* of the protruding block portion 32, the water is prevented from entering the tubular portion 41 through the gap G between the notch 44 and the notch closing portion 33.

In the gap G, in the tube axis direction of the tubular portion 41, a gap g is formed between a peripheral edge portion 41$c_1$ of the notch 44 in the tubular wall 41*c* that is adjacent to the first opening peripheral edge portion 41*d* and an end portion 33*a* of the notch closing portion 33 that is adjacent to the first opening peripheral edge portion 41*d* (FIG. 4). Here, a positional relationship between the gap g as a part of the gap G and the end surface 32*a* of the protruding block portion 32 is set as follows to suppress the entry of water through the gap G into the tubular portion 41. The gap g is provided closer to the second opening peripheral edge portion 41*e* than the end surface 32*a* of the protruding block portion 32 in the tube axis direction of the tubular portion 41. In other words, here, an end surface of the peripheral edge portion 41$c_1$ of the tubular wall 41*c* that is adjacent to the second opening peripheral edge portion 41*e* is provided closer to the second opening peripheral edge portion 41*e* than the end surface 32*a* of the protruding block portion 32 at the assembly completion position in the tube axis direction of the tubular portion 41, whereby the gap g is formed closer to the second opening peripheral edge portion 41*e* than the end surface 32*a* of the protruding block portion 32 in the tube axis direction of the tubular portion 41. As a result, in the electrical connection box 1, the water that has hit and bounced off the power-supply-side electrical connection structure 70 can be directed to, for example, an outer wall surface of the tubular wall 41*c* (facing wall body 41*f*) without being directed to the gap g, and the water can fall vertically downward (toward a lower side of the vehicle) without entering the tubular portion 41 through the gap G.

In addition, the block 30 is a wall surface disposed to face the peripheral edge portion 41$c_1$ of the notch 44 in the tubular portion 41, and desirably has a facing wall surface 34 extending toward the first opening peripheral edge portion 41*d* by a creepage distance from the gap g (FIG. 4). As a result, in the electrical connection box 1, even when water enters the gap g or the like, the entry of the water into the tubular portion 41 can be suppressed by the facing wall surface 34.

Figure 14:
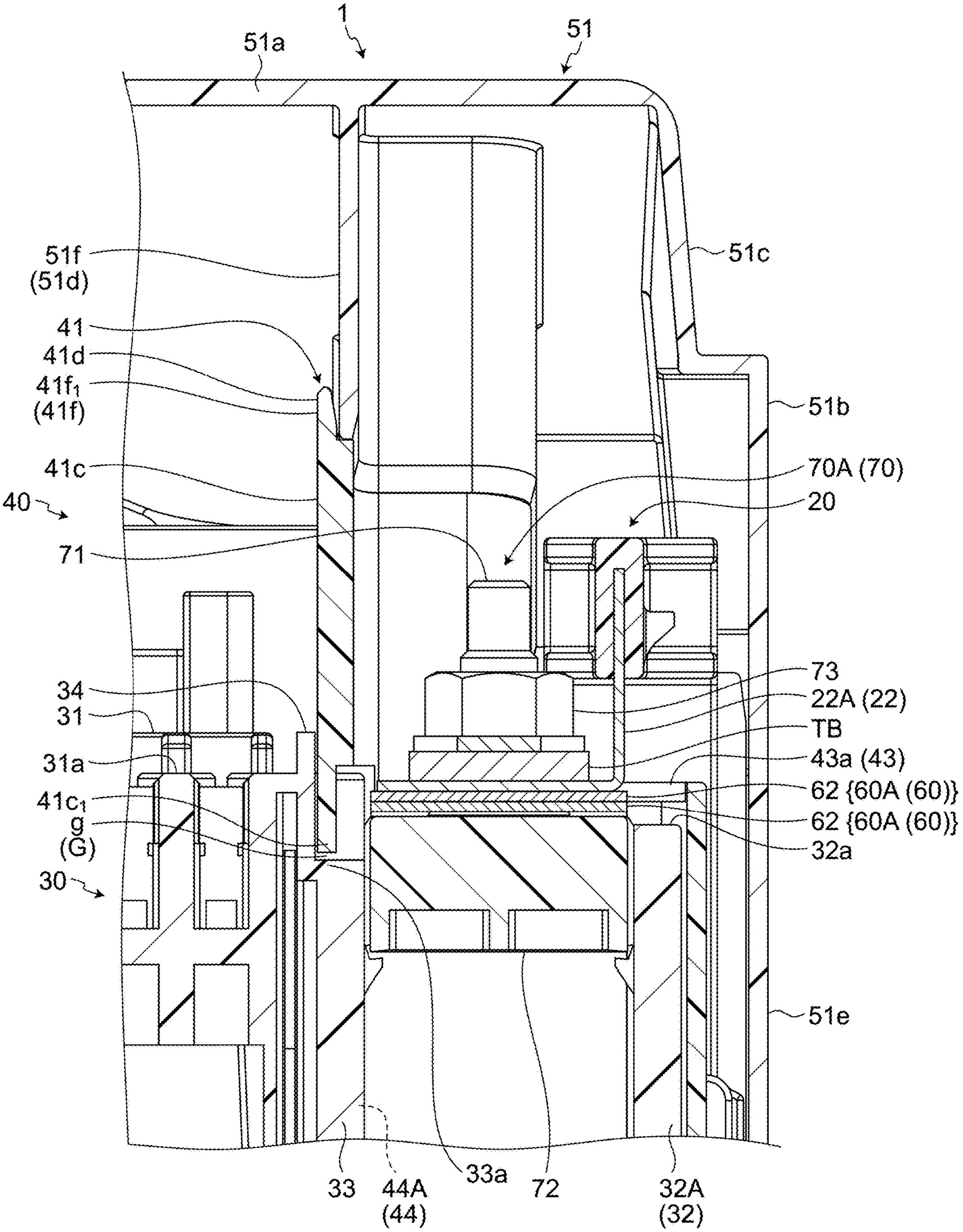
FIG. 14 is a cross-sectional view for describing a positional relationship between an installation surface of an electronic component and a gap in the block.

In addition, in the block 30, it is desirable that an installation surface 31*a* on which the electronic component 10 inserted from the first opening peripheral edge portion 41*d* is mounted is provided more adjacent to the first opening peripheral edge portion 41*d* than the gap g in the block body 31 (FIG. 14). In the electrical connection box 1, by adopting the arrangement of the installation surface 31*a*, for example, even when water has entered the tubular portion 41 through, for example, the gap g in a state where the facing wall surface 34 is not provided, the water can fall vertically downward (toward the lower side of the vehicle) without reaching the installation surface 31*a*. As a result, in the electrical connection box 1, the water is prevented from reaching the terminal fitting or the like of the electronic component 10 positioned on the installation surface 31*a*. In the example of this drawing, the arrangement of the installation surface 31*a* and the facing wall surface 34 are used in combination.

Incidentally, the inside of the sub tubular portion 43 described above communicates with the inside of the tubular portion 41 via the notch 44. Then, the protruding block portion 32 and the power-supply-side electrical connection structure 70 are disposed in the sub tubular portion 43. Therefore, here, the sub tubular portion 43 is used to prevent water from being directed to the gap G. Therefore, it is desirable that the one opening 43*a* of the sub tubular portion 43 that is adjacent to the first opening peripheral edge portion 41*d* is provided closer to the first opening peripheral edge portion 41*d* than the gap g (FIG. 4). As a result, in the electrical connection box 1, water is less likely to be directed from the one opening 43*a* of the sub tubular portion 43 to the gap G, so that it is possible to suppress the water from entering the tubular portion 41 through the gap G.

In the electrical connection box 1, the block body 31 holding the internal conductive member 60 is inserted into the tubular portion 41 through the other opening 41*b*, and the protruding block portion 32 holding the power-supply-side electrical connection structure 70 is inserted into the sub tubular portion 43 through the other opening 43*b* that is adjacent to the second opening peripheral edge portion 41*e* together with the second electrical connection portion 62 of the internal conductive member 60. In the electrical connection box 1, the protruding block portion 32, the power-supply-side electrical connection structure 70, and the second electrical connection portion 62 of the internal conductive member 60 are housed in the sub tubular portion 43 in a state where the male screw portion of the male screw member 71 is pulled out vertically upward (toward the upper side of the vehicle) from the one opening 43*a* of the sub tubular portion 43 (FIG. 4).

In the electrical connection box 1, the male screw portion of the male screw member 71 is inserted into the through-hole 22*a* to assemble the power supply connection portion 22 of the circuit branching member (circuit protection member) 21 to the power-supply-side electrical connection structure 70, and further, the male screw portion of the male screw member 71 is inserted into the through-hole TBa to assemble the power-supply-side terminal fitting TB to the power-supply-side electrical connection structure 70. In the electrical connection box 1, the female screw member 73 is screwed to the male screw portion of the male screw member 71 to fasten and fix the power-supply-side terminal fitting TB, the second electrical connection portion 62 of the internal conductive member 60, and the power supply connection portion 22 of the circuit branching member (circuit protection member) 21 together. In the electrical connection box 1, the power-supply-side terminal fitting TB and the circuit branching component (circuit protection component) 20 are assembled to the block 30 via the power-supply-side electrical connection structure 70.

The one opening 43*a* of the sub tubular portion 43 is covered with the first cover member 51 assembled to the frame 40 together with the power-supply-side terminal fitting TB, the second electrical connection portion 62 of the internal conductive member 60, the power supply connection portion 22 of the circuit branching member (circuit protection member) 21, and the power-supply-side electrical connection structure 70, and is housed in the first cover member 51. The first cover member 51 covers the recess 42 of the frame 40, and houses the circuit branching component (circuit protection component) 20 in the recess 42 in a space between the recess 42 and the first cover member 51.

Specifically, the first cover member 51 includes a cover main body 51*a* that is disposed to face the one opening 41*a* of the tubular portion 41, an annular outer peripheral wall body 51*b* that covers the first opening peripheral edge portion 41*d* from the outside of the tubular portion 41, a closing wall body 51*c* that closes a gap between the cover main body 51*a* and the outer peripheral wall body 51*b*, an annular inner peripheral wall body 51*d* that is disposed at an interval from the outer peripheral wall body 51*b* on an inner side of the outer peripheral wall body 51*b* and is fitted to the first opening peripheral edge portion 41*d*, and a waterproof cover wall body 51*e* that protrudes from the outer peripheral wall body 51*b* to a position where the gap g and the power-supply-side electrical connection structure 70 are covered between the waterproof cover wall body 51*e* and the tubular wall 41*c* of the tubular portion 41.

In the first cover member 51, a gap between a peripheral edge portion of the cover main body 51*a* and a peripheral edge portion of one opening of the outer peripheral wall body 51*b* that is adjacent to the cover main body 51*a* is closed by the closing wall body 51*c*. Therefore, in the first cover member 51, the cover main body 51*a*, the outer peripheral wall body 51*b*, and the closing wall body 51*c* form an internal space opened on a side of the outer peripheral wall body 51*b* that is opposite to the cover main body 51*a*.

Figure 5:
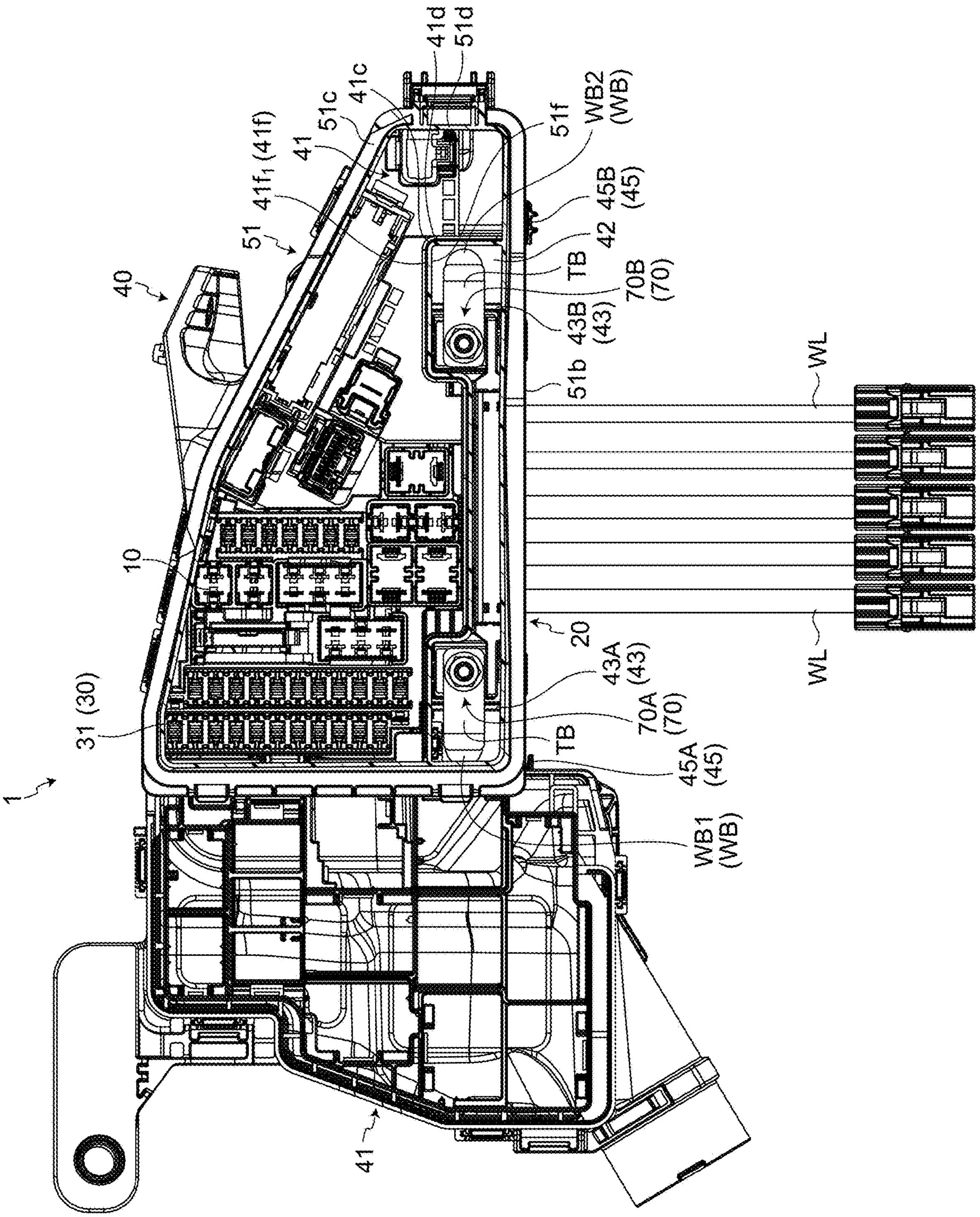
FIG. 5 is a cross-sectional view taken along line Y1-Y1 of FIG. 2.

The outer peripheral wall body 51*b* is disposed to face the facing wall body 41*f* at an interval corresponding to at least a space where the circuit branching component (circuit protection component) 20 is present (FIG. 5). Therefore, in the first cover member 51, the cover main body 51*a*, the outer peripheral wall body 51*b*, and the closing wall body 51*c* can cover the circuit branching component (circuit protection component) 20 from a one opening 41*a* side outside the tubular portion 41. Therefore, the first cover member 51 can suppress splashing of water onto the circuit branching component (circuit protection component) 20 from vertically above (from the upper side of the vehicle). Here, the cover main body 51*a*, the outer peripheral wall body 51*b*, and the closing wall body 51*c* cover the one opening 43*a* of the sub tubular portion 43 and the power-supply-side electric wire WB together with the circuit branching component (circuit protection component) 20 from the one opening 41*a* side outside the tubular portion 41. Therefore, the first cover member 51 can cover the circuit branching component (circuit protection component) 20, the power-supply-side terminal fitting TB, the second electrical connection portion 62 of the internal conductive member 60, and the power-supply-side electrical connection structure 70 from the one opening 41*a* side outside the tubular portion 41. Therefore, the first cover member 51 can suppress splashing of water onto the circuit branching component (circuit protection component) 20, the power-supply-side terminal fitting TB, and the like from vertically above (from the upper side of the vehicle). Therefore, the first cover member 51 can prevent water coming from vertically above (from the upper side of the vehicle) from reaching the gap G through the one opening 43*a* of the sub tubular portion 43.

The inner peripheral wall body 51*d* is disposed in an internal space formed by the cover main body 51*a*, the outer peripheral wall body 51*b*, and the closing wall body 51*c*. The inner peripheral wall body 51*d* is an annular wall body extending to the cover main body 51*a* and connected to the cover main body 51*a*. In the first cover member 51, the cover main body 51*a* and the inner peripheral wall body 51*d* form an internal space opened on a side of the inner peripheral wall body 51*d* that is opposite to the cover main body 51*a*. That is, the inner peripheral wall body 51*d* forms a partition wall that divides the internal space formed by the cover main body 51*a*, the outer peripheral wall body 51*b*, and the closing wall body 51*c* by two.

Figure 7:
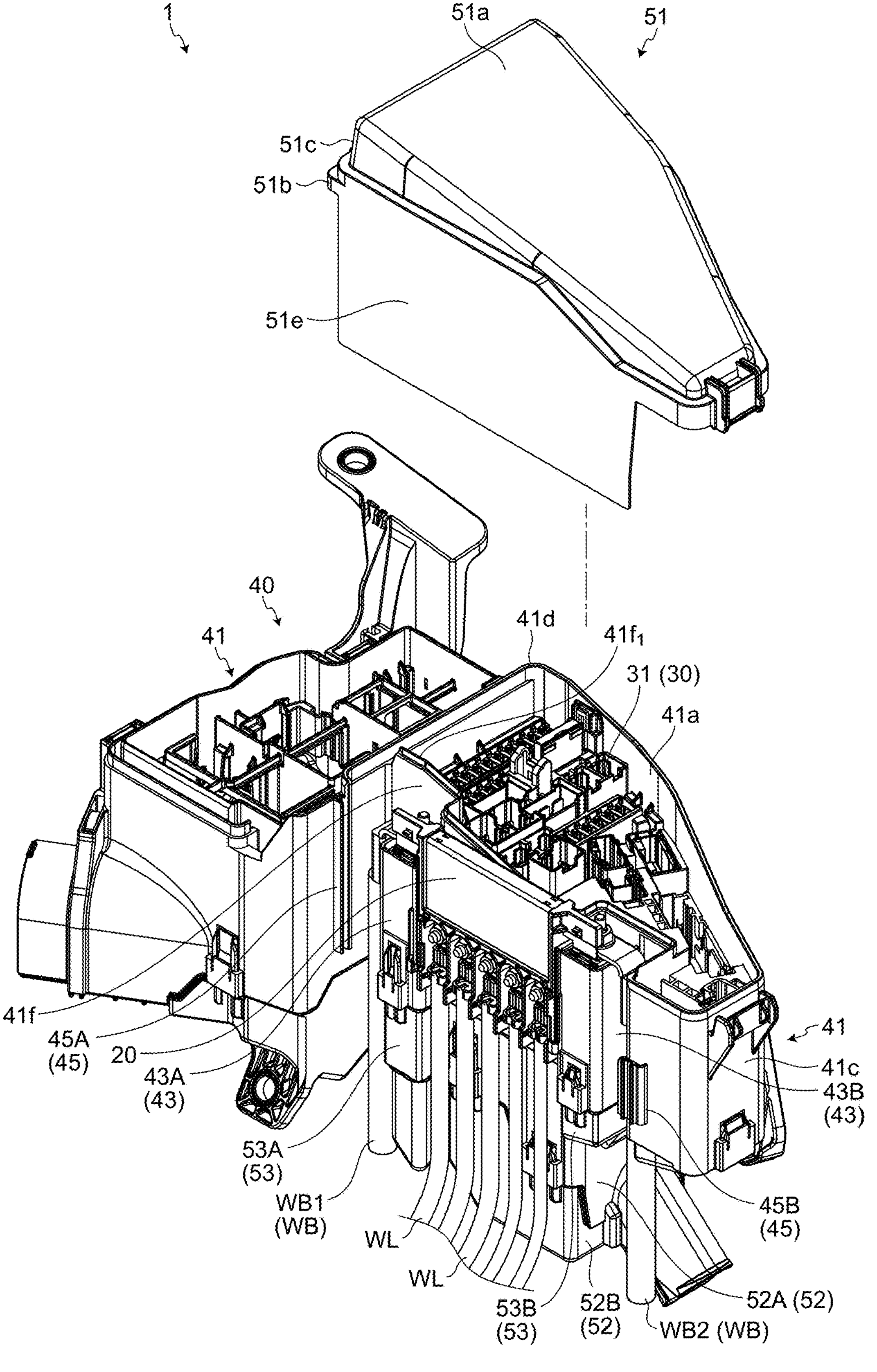
FIG. 7 is an exploded perspective view of the frame and the first cover member in the electrical connection box according to the embodiment.
Figure 10:
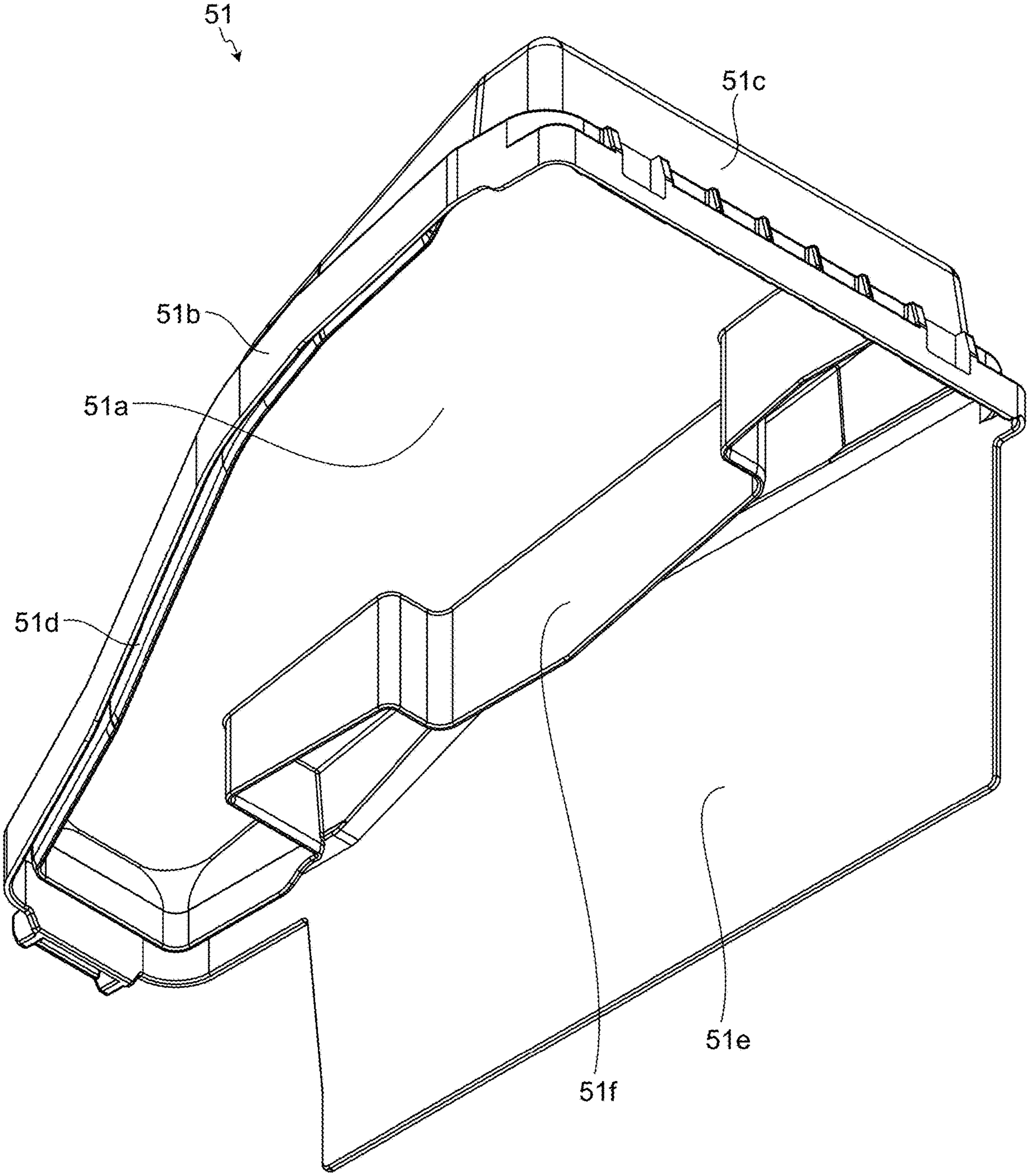
FIG. 10 is a perspective view illustrating the first cover member.

The inner peripheral wall body 51*d* has a waterproof wall portion 51*f* that is fitted to a peripheral edge portion $41f_1$ of the facing wall body 41*f* that is adjacent to the one opening 41*a* from the outside of the tubular portion 41 and covers the peripheral edge portion $41f_1$ of the facing wall body 41*f* that is a part of the first opening peripheral edge portion 41*d* from the outside of the tubular portion 41 (FIGS. 5, 7, and 10).

The waterproof cover wall body 51*e* illustrated here is provided as a wall body for suppressing water splashing onto the circuit branching component (circuit protection component) 20. The waterproof cover wall body 51*e* protrudes from the outer peripheral wall body 51*b* to a position where the circuit branching component (circuit protection component) 20 is covered between the waterproof cover wall body 51*e* and the facing wall body 41*f* (FIGS. 1 and 2). The waterproof cover wall body 51*e* protrudes from the outer peripheral wall body 51*b* toward the other opening 41*b* of the tubular portion 41 in the tube axis direction of the tubular portion 41, and is disposed to face the facing wall body 41*f* at an interval. As a result, the first cover member 51 can cover the circuit branching component (circuit protection component) 20 from the one opening 41*a* side outside the tubular portion 41 by the cover main body 51*a*, the outer peripheral wall body 51*b*, and the closing wall body 51*c*, and cover the circuit branching component (circuit protection component) 20 from a facing wall body 41*f* side (that is, a lateral side of the frame 40) outside the tubular portion 41 by the waterproof cover wall body 51*e*. Therefore, the first cover member 51 can suppress splashing of water onto the circuit branching component (circuit protection component) 20 from vertically above (from the upper side of the vehicle), and can suppress splashing of water onto the circuit branching component (circuit protection component) 20 from a front side of the vehicle, a rear side of the vehicle, a lateral side of the vehicle, or the like.

Further, the waterproof cover wall body 51*e* is formed in a shape that covers the sub tubular portion 43 and the power-supply-side electric wire WB together with the circuit branching component (circuit protection component) 20 (FIGS. 1 and 2). Therefore, the first cover member 51 can cover the circuit branching component (circuit protection component) 20, the power-supply-side terminal fitting TB, the second electrical connection portion 62 of the internal conductive member 60, and the power-supply-side electrical connection structure 70 from the one opening 41*a* side outside the tubular portion 41 by the cover main body 51*a*, the outer peripheral wall body 51*b*, and the closing wall body 51*c*, and cover the circuit branching component (circuit protection component) 20, the power-supply-side terminal fitting TB, the second electrical connection portion 62 of the internal conductive member 60, and the power-supply-side electrical connection structure 70 from the facing wall body 41*f* side (the lateral side of the frame 40) outside the tubular portion 41 by the waterproof cover wall body 51*e*. Therefore, the first cover member 51 can suppress splashing of water onto the circuit branching component (circuit protection component) 20, the power-supply-side terminal fitting TB, and the like from vertically above (from the upper side of the vehicle), and can suppress splashing of water onto the circuit branching component (circuit protection component) 20, the power-supply-side terminal fitting TB, and the like from the front side of the vehicle, the rear side of the vehicle, the lateral side of the vehicle, and the like. For example, the first cover member 51 can prevent water coming from the front side of the vehicle, the rear side of the vehicle, the lateral side of the vehicle, or the like from reaching the gap G through the one opening 43*a* of the sub tubular portion 43 by the waterproof cover wall body 51*e*.

In addition, the first cover member 51 covers the entire circuit branching component (circuit protection component) 20 from the facing wall body 41*f* side (the lateral side of the frame 40) outside the tubular portion 41 by the waterproof cover wall body 51*e*. That is, the waterproof cover wall body 51*e* covers the circuit branching component (circuit protection component) 20 from an end portion of the tubular portion 41 that is adjacent to the one opening 41*a* to an end portion that is adjacent to the other opening 41*b*. Therefore, the waterproof cover wall body 51*e* makes it difficult for water splashed up from vertically below (from the lower side of the vehicle) to reach an end portion of the circuit branching component (circuit protection component) 20 that is adjacent to the other opening 41*b*, and can suppress water from reaching the power-supply-side electrical connection structure 70 and the load-side electrical connection structure 75. Therefore, the waterproof cover wall body 51*e* can prevent water splashed up from vertically below (from the lower side of the vehicle) from reaching the gap G through the one opening 43*a* of the sub tubular portion 43.

As described above, the first cover member 51 can ensure waterproofness for the circuit branching component (circuit protection component) 20, the power-supply-side electrical connection structure 70, and the like outside the tubular portion 41.

Here, the waterproof cover wall body 51*e* is formed as a cantilevered flat plate having an outer peripheral wall body 51*b* side end portion as a fixed end and the other opening 41*b* side end portion protruding from the outer peripheral wall body 51*b* as a free end. Therefore, when the waterproof cover wall body 51*e* is deformed in a direction away from the circuit branching component (circuit protection component) 20 and a distance from the facing wall body 41*f* is increased at the other opening 41*b* side end portion, water easily enters through the gap.

Figure 15:
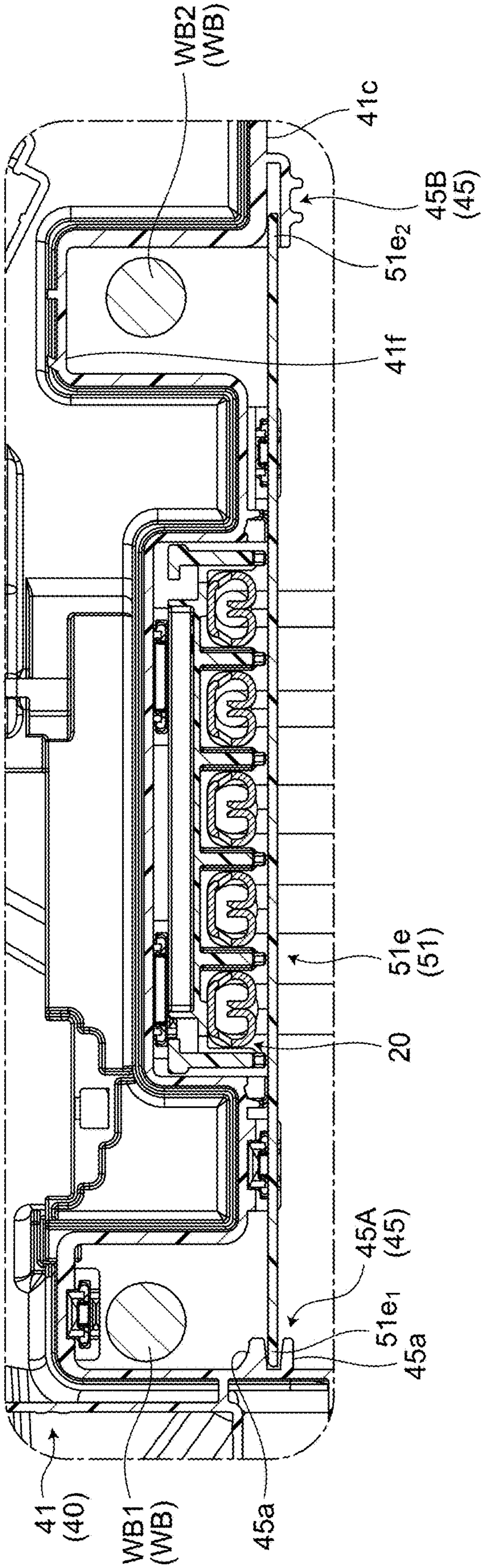
FIG. 15 is a partially enlarged view taken along line Y2-Y2 of FIG. 2.
Figure 16:
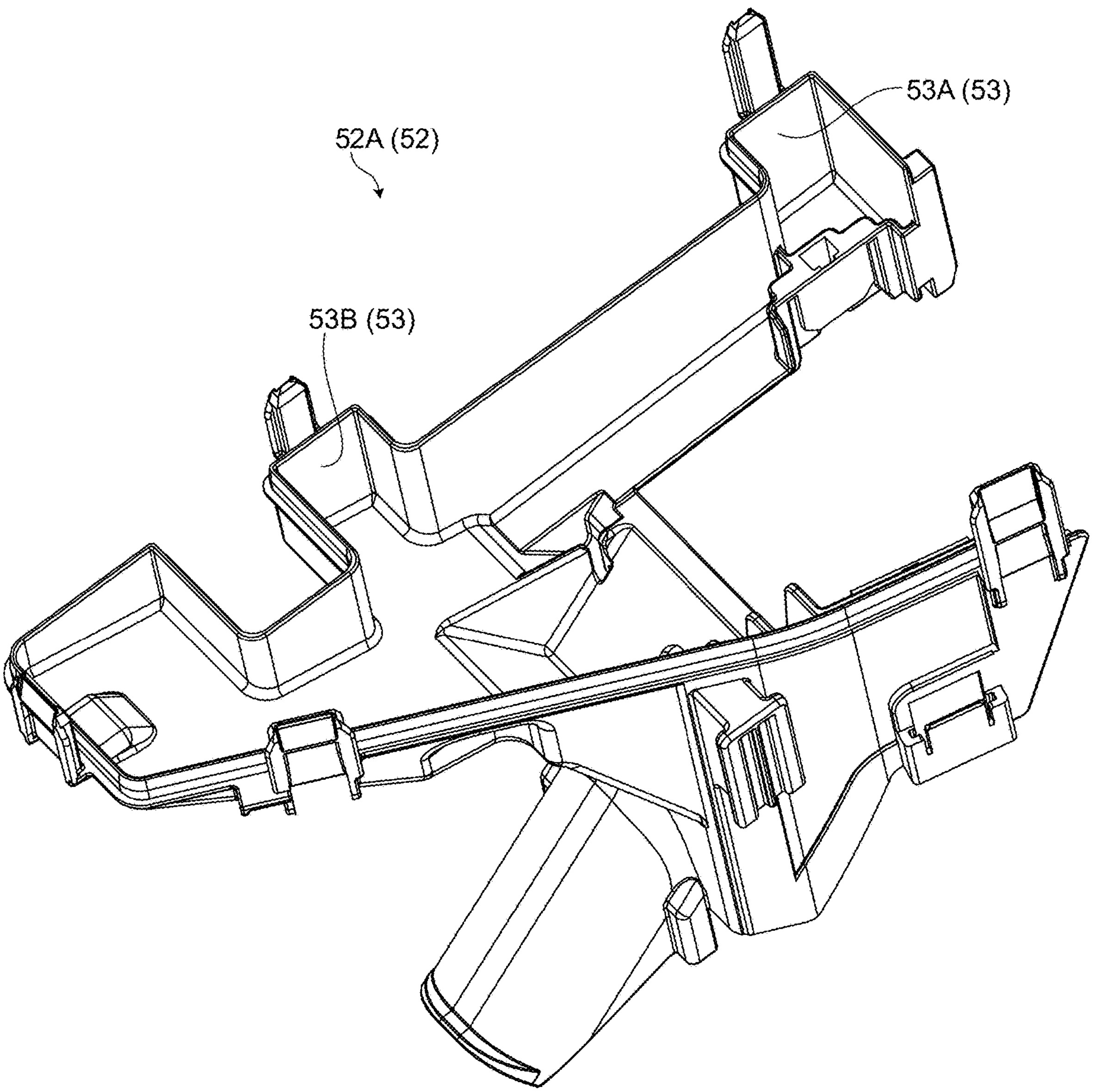
FIG. 16 is a perspective view illustrating a first divided cover.

Therefore, the frame 40 includes at least two cover deformation suppressing portions 45 into which a peripheral edge of the waterproof cover wall body 51*e* is fitted to suppress deformation of the waterproof cover wall body 51*e* in a direction away from the circuit branching component (circuit protection component) 20 (FIGS. 1 to 3, 5 to 7, 9, and 15). The waterproof cover wall body 51*e* has two side end portions 51$e_1$ and 51$e_2$ along a protruding direction from the outer peripheral wall body 51*b* (FIG. 15). Here, as the cover deformation suppressing portions 45, a first cover deformation suppressing portion 45A that locks an outer wall surface (a wall surface on a side opposite to the circuit branching component (circuit protection component) 20) at one side end portion 51$e_1$ of the waterproof cover wall body 51*e* and a second cover deformation suppressing portion 45B that locks an outer wall surface (the wall surface on the side opposite to the circuit branching component (circuit protection component) 20) at the other side end portion 51$e_2$ of the waterproof cover wall body 51*e* are provided in a protruding state on the tubular wall 41*c* of the tubular portion 41.

The first cover deformation suppressing portion 45A includes a pair of protruding portions 45*a* and 45*a* protruding from the tubular wall 41*c* outside the tubular portion 41 and extending in a direction in which the first cover member 51 is assembled to the tubular portion 41. The pair of protruding portions 45*a* and 45*a* is arranged with a gap larger than a plate thickness of the waterproof cover wall body 51*e* therebetween, and the one side end portion 51$e_1$ of the waterproof cover wall body 51*e* enters the gap therebetween. In the first cover deformation suppressing portion 45A, the one side end portion 51$e_1$ of the waterproof cover wall body 51*e* is inserted between the pair of protruding portions 45*a* and 45*a* along with an operation of assembling the first cover member 51 to the tubular portion 41. In the first cover deformation suppressing portion 45A, one protruding portion 45*a* disposed to face an outer wall surface of the one side end portion 51$e_1$ of the waterproof cover wall body 51*e* locks the outer wall surface.

The second cover deformation suppressing portion 45B is a protruding body protruding from the tubular wall 41*c* outside the tubular portion 41, is formed as an L-shaped protruding body having an L-shaped cross section orthogonal to the direction in which the first cover member 51 is assembled to the tubular portion 41, and locks an outer wall surface of the other side end portion 51$e_2$ of the waterproof cover wall body 51*e*.

Here, the first cover deformation suppressing portion 45A locks the one side end portion 51$e_1$ of the waterproof cover wall body 51*e* from an outer wall surface side, and the second cover deformation suppressing portion 45B locks the other side end portion 51$e_2$ of the waterproof cover wall body 51*e* from the outer wall surface side, thereby suppressing deformation of the waterproof cover wall body 51*e* in a direction away from the circuit branching component (circuit protection component) 20. Therefore, the first cover member 51 can keep preventing water from reaching the power-supply-side electrical connection structure 70 or the load-side electrical connection structure 75 by splashing up from vertically below (from the lower side of the vehicle) by the waterproof cover wall body 51*e*. Therefore, the first cover member 51 can prevent water splashed up from vertically below (from the lower side of the vehicle) from reaching the gap G through the one opening 43*a* of the sub tubular portion 43.

The second cover member 52 includes a closing portion 53 that closes the other opening 43*b* of the sub tubular portion 43 (FIGS. 1, 2, 7, 9, and 16). The other opening 43*b* of the sub tubular portion 43 is closed by the closing portion 53 of the second cover member 52 assembled to the frame 40 so as not to be exposed to the outside of the frame 40.

In the electrical connection box 1, all core wires of the power-supply-side electric wire WB and the load-side electric wire WL may be formed of copper or a copper alloy. However, in order to reduce weights of the power-supply-side electric wire WB and the load-side electric wire WL, at least one core wire thereof is desirably formed of aluminum or an aluminum alloy. For example, the power-supply-side electric wire WB and the load-side electric wire WL may be formed such that all the core wires are formed of aluminum or an aluminum alloy, or at least one core wire may be formed of aluminum or an aluminum alloy, and the remaining core wires may be formed of copper or a copper alloy.

In a case where the core wires of the power-supply-side electric wire WB and the load-side electric wire WL are formed of aluminum or an aluminum alloy, the weights of the power-supply-side electric wire WB and the load-side electric wire WL can be reduced as compared with a case where the core wires are formed of copper or a copper alloy. However, in this case, the power-supply-side electric wire WB and the load-side electric wire WL become thick and hard for a large current, and are difficult to bend. However, in the electrical connection box 1, the circuit branching component (circuit protection component) 20 is disposed outside the frame 40 and outside the tubular portion 41, and such a power-supply-side electric wire WB and a load-side electric wire WL that are difficult to bend are routed outside the frame 40. Therefore, the electrical connection box 1 can suppress an overload applied to the periphery in the housing due to the power-supply-side electric wire WB or the like, and can improve a housing property for other electric wires in the tubular portion 41.

Specifically, the electrical connection box 1 illustrated here includes, as the internal conductive members 60, a first internal conductive member 60A and a second internal conductive member 60B, and the first internal conductive member 60A and the second internal conductive member 60B are held by the block 30 (FIGS. 6 and 8). Here, two types of first internal conductive members 60A are provided as the internal conductive members 60.

The circuit branching member (circuit protection member) 21 illustrated here includes a first power supply connection portion 22A and a second power supply connection portion 22B as the power supply connection portions 22, and the first power supply connection portion 22A and the second power supply connection portion 22B are electrically connected to a first power-supply-side electric wire WB1 and a second power-supply-side electric wire WB2 as the power-supply-side electric wires WB, respectively (FIGS. 6, 11, and 12). In the circuit branching member (circuit protection member) 21, the first power supply connection portion 22A and the second power supply connection portion 22B are coupled by the coupling portion 25, and the fusible portion 24 is coupled to the first power supply connection portion 22A and the second power supply connection portion 22B via the coupling portion 25. That is, the fusible portion 24 is interposed between the first power supply connection portion 22A and the load connection portion 23, and is interposed between the second power supply connection portion 22B and the load connection portion 23.

The first power-supply-side electric wire WB1 is interposed between the first power supply connection portion 22A and the external power supply B when viewed from the circuit branching member (circuit protection member) 21, and electrically connects the first power supply connection portion 22A to the external power supply B. The second power-supply-side electric wire WB2 is electrically connected to an external electric component P such as an alternator or a DC-DC converter disposed outside the housing, and is electrically connected to the external power supply B via the circuit branching member (circuit protection member) 21 and the first power-supply-side electric wire WB1. That is, the second power-supply-side electric wire WB2 electrically connects the external electric component P to the external power supply B via the circuit branching member (circuit protection member) 21 and the first power-supply-side electric wire WB1.

The first power supply connection portion 22A is physically and electrically connected to the power-supply-side terminal fitting TB of the terminal of the first power-supply-side electric wire WB1 and the second electrical connection portion 62 of the first internal conductive member 60A. The electrical connection box 1 includes, as the power-supply-side electrical connection structures 70, a first power-supply-side electrical connection structure 70A that physically and electrically connects the power-supply-side terminal fitting TB of the terminal of the first power-supply-side electric wire WB1, the second electrical connection portion 62 of the first internal conductive member 60A, and the first power supply connection portion 22A of the circuit branching member (circuit protection member) 21 to each other (FIGS. 2, 3, 5, 6, and 8). In the first power-supply-side electrical connection structure 70A, the male screw portion of the male screw member 71 is inserted into each of the through-holes TBa, 62*a*, and 22*a* of the power-supply-side terminal fitting TB of the terminal of the first power-supply-side electric wire WB1, the second electrical connection portion 62 of the first internal conductive member 60A, and the first power supply connection portion 22A of the circuit branching member (circuit protection member) 21, and the female screw member 73 is screwed to the male screw portion, whereby the power-supply-side terminal fitting TB, the second electrical connection portion 62 of the first internal conductive member 60A, and the first power supply connection portion 22A of the circuit branching member (circuit protection member) 21 are fastened and fixed together. Here, the power-supply-side terminal fitting TB, the second electrical connection portion 62 of each of the two first internal conductive members 60A, and the first power supply connection portion 22A of the circuit branching member (circuit protection member) 21 are fastened and fixed together.

The frame 40 illustrated here includes, as the sub tubular portion 43, a first sub tubular portion 43A which houses the first power-supply-side electrical connection structure 70A therein and through which the male screw portion of the male screw member 71 in the first power-supply-side electrical connection structure 70A protrudes from the one opening 43*a* (FIGS. 1 to 3, 5, 6, 9, and 13). The first sub tubular portion 43A is provided in the recess 42 of the frame 40. The tubular wall 41*c* of the tubular portion 41 has, as the notch 44, a first notch 44A through which the inside of the tubular portion 41 communicates with the inside of the first sub tubular portion 43A, and the second electrical connection portion 62 of the first internal conductive member 60A protrudes toward the outside the frame 40 outside the tubular portion 41 (FIG. 6). The block 30 includes, as the protruding block portion 32 to which the screw holding member 72 of the first power-supply-side electrical connection structure 70A is assembled, a first protruding block portion 32A that protrudes from the first notch 44A toward the outside of the tubular portion 41 and is housed in the first sub tubular portion 43A (FIGS. 6 and 8).

In the electrical connection box 1, the first protruding block portion 32A, the first power-supply-side electrical connection structure 70A, and the second electrical connection portions 62 of each of the two first internal conductive members 60A are housed in the first sub tubular portion 43A in a state where the male screw portion of the male screw member 71 is pulled out vertically upward (toward the upper side of the vehicle) from the one opening 43*a* of the first sub tubular portion 43A (FIG. 4).

The second power supply connection portion 22B is physically and electrically connected to the power-supply-side terminal fitting TB of the terminal of the second power-supply-side electric wire WB2 and the second electrical connection portion 62 of the second internal conductive member 60B. The electrical connection box 1 includes, as the power-supply-side electrical connection structure 70, a second power-supply-side electrical connection structure 70B that physically and electrically connects the power-supply-side terminal fitting TB of the terminal of the second power-supply-side electric wire WB2, the second electrical connection portion 62 of the second internal conductive member 60B, and the second power supply connection portion 22B of the circuit branching member (circuit protection member) 21 to each other (FIGS. 2, 3, 5, 6, and 8). In the second power-supply-side electrical connection structure 70B, the male screw portion of the male screw member 71 is inserted into each of the through-holes TBa, 62*a*, and 22*a* of the power-supply-side terminal fitting TB of the terminal of the second power-supply-side electric wire WB2, the second electrical connection portion 62 of the second internal conductive member 60B, and the second power supply connection portion 22B of the circuit branching member (circuit protection member) 21, and the female screw member 73 is screwed to the male screw portion, whereby the power-supply-side terminal fitting TB, the second electrical connection portion 62 of the second internal conductive member 60B, and the second power supply connection portion 22B of the circuit branching member (circuit protection member) 21 are fastened and fixed together.

The frame 40 illustrated here includes, as the sub tubular portion 43, a second sub tubular portion 43B which houses the second power-supply-side electrical connection structure 70B therein and through which the male screw portion of the male screw member 71 in the second power-supply-side electrical connection structure 70B protrudes from the one opening 43*a* (FIGS. 1 to 3, 5, 6, 9, and 13). The second sub tubular portion 43B is provided in the recess 42 of the frame 40. The tubular wall 41*c* of the tubular portion 41 has, as the notch 44, a second notch 44B through which the inside of the tubular portion 41 communicates with the inside of the second sub tubular portion 43B, and the second electrical connection portion 62 of the second internal conductive member 60B protrudes toward the outside of the frame 40 outside the tubular portion 41 (FIG. 5). The block 30 includes, as the protruding block portion 32 to which the screw holding member 72 of the second power-supply-side electrical connection structure 70B is assembled, a second protruding block portion 32B that protrudes from the second notch 44B toward the outside of the tubular portion 41 and is housed in the second sub tubular portion 43B (FIGS. 6 and 8).

In the electrical connection box 1, the second protruding block portion 32B, the second power-supply-side electrical connection structure 70B, and the second electrical connection portion 62 of the second internal conductive member 60B are housed in the second sub tubular portion 43B in a state where the male screw portion of the male screw member 71 is pulled out vertically upward (toward the upper side of the vehicle) from the one opening 43*a* of the second sub tubular portion 43B.

In the electrical connection box 1, the male screw portion of the male screw member 71 of the first power-supply-side electrical connection structure 70A is inserted into the through-hole 22*a* of the first power supply connection portion 22A to assemble the first power supply connection portion 22A to the first power-supply-side electrical connection structure 70A, and the male screw portion of the male screw member 71 of the second power-supply-side electrical connection structure 70B is inserted into the through-hole 22*a* of the second power supply connection portion 22B to assemble the second power supply connection portion 22B to the second power-supply-side electrical connection structure 70B. In the electrical connection box 1, the male screw portion of the male screw member 71 of the first power-supply-side electrical connection structure 70A is inserted into the through-hole TBa of the power-supply-side terminal fitting TB of the first power-supply-side electric wire WB1 to assemble the power-supply-side terminal fitting TB to the first power-supply-side electrical connection structure 70A, and the male screw portion of the male screw member 71 of the second power-supply-side electrical connection structure 70B is inserted into the through-hole TBa of the power-supply-side terminal fitting TB of the second power-supply-side electric wire WB2 to assemble the power-supply-side terminal fitting TB to the second power-supply-side electrical connection structure 70B. In the electrical connection box 1, the female screw member 73 is screwed to the male screw portion of each male screw member 71 to fasten and fix the power-supply-side terminal fitting TB of the first power-supply-side electric wire WB1, the respective second electrical connection portions 62 of the two first internal conductive members 60A, and the first power supply connection portion 22A of the circuit branching member (circuit protection member) 21 together, and fasten and fix the power-supply-side terminal fitting TB of the second power-supply-side electric wire WB2, the second electrical connection portion 62 of the second internal conductive member 60B, and the second power supply connection portion 22B of the circuit branching member (circuit protection member) 21 together. In the electrical connection box 1, the two power-supply-side terminal fittings TB and the circuit branching component (circuit protection component) 20 are assembled to the block 30 via the first power-supply-side electrical connection structure 70A and the second power-supply-side electrical connection structure 70B.

The first power-supply-side electrical connection structure 70A physically and electrically connects the power-supply-side terminal fitting TB of the first power-supply-side electric wire WB1, the second electrical connection portion 62 of each of the two first internal conductive members 60A, and the first power supply connection portion 22A of the circuit branching member (circuit protection member) 21 at a position protruding from the end surface 32*a* of the first protruding block portion 32A that is adjacent to the first opening peripheral edge portion 41*d* (FIG. 4). The gap g formed between the peripheral edge portion $\mathbf{41}c_1$ of the first notch 44A of the tubular wall 41*c* that is adjacent to the first opening peripheral edge portion 41*d* and the end portion 33*a* of the notch closing portion 33 that is adjacent to the first protruding block portion 32A on a first opening peripheral edge portion 41*d* side is provided more adjacent to the second opening peripheral edge portion 41*e* than the end surface 32*a* of the first protruding block portion 32A in the tube axis direction of the tubular portion 41. As a result, in the electrical connection box 1, water that hits and bounces off the first power-supply-side electrical connection structure 70A can fall vertically downward (toward the lower side of the vehicle) without being directed to the gap g.

In addition, in the electrical connection box 1, the block 30 has the facing wall surface 34 disposed to face the peripheral edge portion $\mathbf{41}c_1$ of the first notch 44A in the tubular portion 41, and thus, even when water enters the gap g on a first notch 44A side or the like, the entry of the water into the tubular portion 41 can be suppressed by the facing wall surface 34.

In addition, in the electrical connection box 1, the installation surface 31*a* of the block 30 for the electronic component 10 is provided more adjacent to the first opening peripheral edge portion 41*d* than the gap g on the first notch 44A side, so that even when water enters the tubular portion 41 due to, for example, the entry through the gap g, the water is prevented from reaching the terminal fitting or the like of the electronic component 10 positioned on the installation surface 31*a*.

Further, in the electrical connection box 1, the one opening 43*a* of the first sub tubular portion 43A that is adjacent to the first opening peripheral edge portion 41*d* is provided more adjacent to the first opening peripheral edge portion 41*d* than the gap g on the first notch 44A side, and water is hardly directed from the one opening 43*a* of the first sub tubular portion 43A to the gap G on the first notch 44A side, so that it is possible to suppress the water from entering the tubular portion 41 through the gap G.

In addition, the second power-supply-side electrical connection structure 70B physically and electrically connects the power-supply-side terminal fitting TB of the second power-supply-side electric wire WB2, the second electrical connection portion 62 of the second internal conductive member 60B, and the second power supply connection portion 22B of the circuit branching member (circuit protection member) 21 at a position protruding from the end surface 32*a* of the second protruding block portion 32B that is adjacent to the first opening peripheral edge portion 41*d*. The gap g formed between the peripheral edge portion $41c_1$ of the second notch 44B of the tubular wall 41*c* that is adjacent to the first opening peripheral edge portion 41*d* and the end portion 33*a* of the notch closing portion 33 that is adjacent to the second protruding block portion 32B on the first opening peripheral edge portion 41*d* side is provided more adjacent to the second opening peripheral edge portion 41*e* than the end surface 32*a* of the second protruding block portion 32B in the tube axis direction of the tubular portion 41. As a result, in the electrical connection box 1, water that hits and bounces off the second power-supply-side electrical connection structure 70B can fall vertically downward (toward the lower side of the vehicle) without being directed to the gap g.

In addition, in the electrical connection box 1, the block 30 has the facing wall surface 34 disposed to face the peripheral edge portion $41c_1$ of the second notch 44B in the tubular portion 41, and thus, even when water enters the gap g on a second notch 44B side or the like, the entry of the water into the tubular portion 41 can be suppressed by the facing wall surface 34.

In addition, in the electrical connection box 1, the installation surface 31*a* of the block 30 for the electronic component 10 is provided more adjacent to the first opening peripheral edge portion 41*d* than the gap g on the second notch 44B side, so that even when water enters the tubular portion 41 due to, for example, the entry through the gap g, the water is prevented from reaching the terminal fitting or the like of the electronic component 10 positioned on the installation surface 31*a*.

Further, in the electrical connection box 1, the one opening 43*a* of the second sub tubular portion 43B that is adjacent to the first opening peripheral edge portion 41*d* is provided more adjacent to the first opening peripheral edge portion 41*d* than the gap g on the second notch 44B side, and water is hardly directed from the one opening 43*a* of the second sub tubular portion 43B to the gap G on the second notch 44B side, so that it is possible to suppress the water from entering the tubular portion 41 through the gap G.

The one opening 43*a* of each of the first sub tubular portion 43A and the second sub tubular portion 43B is covered by the first cover member 51 together with the two power-supply-side terminal fittings TB, the second electrical connection portion 62 of each of the two first internal conductive members 60A and the second internal conductive member 60B, the first power supply connection portion 22A and the second power supply connection portion 22B of the circuit branching member (circuit protection member) 21, the first power-supply-side electrical connection structure 70A and the second power-supply-side electrical connection structure 70B, and is housed in the first cover member 51.

In the first cover member 51, the cover main body 51*a*, the outer peripheral wall body 51*b*, and the closing wall body 51*c* cover the one opening 43*a* of each of the first sub tubular portion 43A and the second sub tubular portion 43B, the first power-supply-side electric wire WB1, and the second power-supply-side electric wire WB2 together with the circuit branching component (circuit protection component) 20 from the one opening 41*a* side outside the tubular portion 41. Therefore, the first cover member 51 can cover the circuit branching component (circuit protection component) 20, the two power-supply-side terminal fittings TB, the second electrical connection portions 62 of the two first internal conductive members 60A and the second internal conductive members 60B, the first power-supply-side electrical connection structure 70A, and the second power-supply-side electrical connection structure 70B from the one opening 41*a* side outside the tubular portion 41. Therefore, the first cover member 51 can suppress splashing of water onto the circuit branching component (circuit protection component) 20, the power-supply-side terminal fitting TB, and the like from vertically above (from the upper side of the vehicle). Therefore, when water comes from vertically above (from the upper side of the vehicle), the first cover member 51 can prevent the water from reaching the gap G on the first notch 44A side through the one opening 43*a* of the first sub tubular portion 43A, and can prevent the water from reaching the gap G on the second notch 44B side through the one opening 43*a* of the second sub tubular portion 43B.

Furthermore, the first cover member 51 covers the circuit branching component (circuit protection component) 20, the two power-supply-side terminal fittings TB, the second electrical connection portions 62 of the two first internal conductive members 60A and the second internal conductive members 60B, the first power-supply-side electrical connection structure 70A, and the second power-supply-side electrical connection structure 70B from the facing wall body 41*f* side (the lateral side of the frame 40) outside the tubular portion 41 by the waterproof cover wall body 51*e*. Therefore, when water comes from the front side of the vehicle, the rear side of the vehicle, the lateral side of the vehicle, or the like, the waterproof cover wall body 51*e* can prevent the water from reaching the gap G on the first notch 44A side through the one opening 43*a* of the first sub tubular portion 43A, and can prevent the water from reaching the gap G on the second notch 44B side through the one opening 43*a* of the second sub tubular portion 43B. As a result, the first cover member 51 can suppress splashing of water onto the circuit branching component (circuit protection component) 20, the power-supply-side terminal fitting TB, and the like from vertically above (from the upper side of the vehicle), and can suppress splashing of water onto the circuit branching component (circuit protection component) 20, the power-supply-side terminal fitting TB, and the like from the front side of the vehicle, the rear side of the vehicle, the lateral side of the vehicle, and the like.

In addition, the first cover member 51 can prevent water splashing up from vertically below from reaching the first power-supply-side electrical connection structure 70A, the second power-supply-side electrical connection structure 70B, and the load-side electrical connection structure 75 by the waterproof cover wall body 51*e*. In addition, the first cover member 51 can continue to maintain the suppressing function thereof by the cover deformation suppressing portions 45 (the first cover deformation suppressing portion 45A and the second cover deformation suppressing portion 45B). Therefore, the first cover member 51 can prevent water splashing up from vertically below (from the lower side of the vehicle) from reaching each gap G through the one opening 43*a* of the first sub tubular portion 43A or the second sub tubular portion 43B.

As described above, the first cover member 51 can ensure waterproofness for the circuit branching component (circuit protection component) 20, the first power-supply-side electrical connection structure 70A, the second power-supply-side electrical connection structure 70B, and the like outside the tubular portion 41.

The second cover member 52 includes, as the closing portions 53, a first closing portion 53A that closes the other opening 43*b* of the first sub tubular portion 43A so as not to be exposed to the outside of the frame 40, and a second closing portion 53B that closes the other opening 43*b* of the second sub tubular portion 43B so as not to be exposed to the outside of the frame 40 (FIGS. 1, 2, 9, and 16). The first closing portion 53A and the second closing portion 53B may be one plate-shaped wall portion that closes the other opening 43*b* from the outside of the frame 40 together with the first notch 44A and the second notch 44B, or may be formed of a plurality of wall portions that surrounds and covers the other opening 43*b* from the outside of the frame 40 together with the first notch 44A and the second notch 44B. Here, the first divided cover 52A is assembled to the second opening peripheral edge portion 41*e* of the tubular portion 41 on which the first sub tubular portion 43A and the second sub tubular portion 43B are provided. Therefore, the first closing portion 53A and the second closing portion 53B are provided in the first divided cover 52A.

As described above, in the electrical connection box 1 according to the present embodiment, the circuit branching component (circuit protection component) 20 is disposed outside the frame 40 and outside the tubular portion 41, and thus, it is possible to suppress an overload applied to the periphery in the housing due to the power-supply-side electric wire WB (the first power-supply-side electric wire WB1 and the second power-supply-side electric wire WB2) and the load-side electric wire WL connected to the circuit branching component (circuit protection component) 20. In particular, in the electrical connection box 1, the power-supply-side electric wire WB (the first power-supply-side electric wire WB1 and the second power-supply-side electric wire WB2) and the load-side electric wire WL are difficult to bend as the diameter of the electric wire increases, and thus, it is possible to suppress an overload applied to the periphery in the housing due to the power-supply-side electric wire WB and the like. For example, in the electrical connection box 1, the deformation of the second cover member 52 can be suppressed by suppressing an overload applied to the second cover member 52 in the housing due to the power-supply-side electric wire WB or the like. In addition, the electrical connection box 1 can improve the housing property for other electric wires in the tubular portion 41 by routing the power-supply-side electric wire WB and the like that are difficult to bend outside the frame 40. In addition, in the electrical connection box 1, the power-supply-side electric wire WB and the like are routed outside the frame 40, and thus, heat generated by the power-supply-side electric wire WB and the like does not stagnate in the housing, so that a temperature rise in the housing can be suppressed. Further, since the electrical connection box 1 can suppress entry of water into the tubular portion 41 through the gap G while exhibiting these effects, it is possible to ensure the waterproofness while suppressing an overload in the housing.

In the electrical connection box according to the present embodiment, the circuit branching component is disposed outside the tubular portion and outside the frame, so that it is possible to suppress an overload in the housing due to the electric wire connected to the circuit branching component. In the electrical connection box, since the gap exists on a side more adjacent to the second opening peripheral edge portion than the power-supply-side electrical connection structure, water bouncing off the power-supply-side electrical connection structure can be directed to, for example, the outer wall surface of the tubular wall without being directed to the gap, so that the water can fall vertically downward. Therefore, the electrical connection box according to the present embodiment can ensure waterproofness while suppressing the overload in the housing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:

an electronic component;

an internal conductive member that electrically connects the electronic component to an external power supply;

a block that holds the electronic component and the internal conductive member;

a frame that includes a tubular portion that houses and holds the block in the tubular portion and includes a tubular wall having openings at both ends, and is installed such that one of the openings of the tubular portion faces vertically upward;

a first cover member that is fitted to a first opening peripheral edge portion of a peripheral edge of the one opening of the tubular portion and closes the one opening of the tubular portion;

a second cover member that is fitted to a second opening peripheral edge portion of a peripheral edge of the other opening of the tubular portion and closes the other opening of the tubular portion; and a circuit branching component that is disposed outside the frame and outside the tubular portion and is interposed between the external power supply and an external load, wherein the internal conductive member includes a first electrical connection portion and a second electrical connection portion that are physically and electrically connected to the electronic component in the tubular portion, the circuit branching component includes a power supply connection portion that is disposed outside the frame and outside the tubular portion and is physically and electrically connected to a power-supply-side terminal fitting of a terminal of a power-supply-side electric wire electrically connected to the external power supply and the second electrical connection portion of the internal conductive member, and a load connection portion that is electrically connected to a load-side electric wire electrically connected to the external load, the tubular wall of the tubular portion has a notch through which an inside and an outside of the tubular portion communicate with each other and the second electrical connection portion of the internal conductive member protrudes toward an outside of the frame outside the tubular portion, the block includes a protruding block portion that protrudes from the notch toward the outside of the tubular portion, and a notch closing portion that closes the notch, a power-supply-side electrical connection structure that is held by the protruding block portion and physically and electrically connects the power-supply-side terminal fitting of the terminal of the power-supply-side electric wire, the second electrical connection portion of the internal conductive member, and the power supply connection portion of the circuit branching component to each other at a position protruding from an end surface of the protruding block portion that is adjacent to the first opening peripheral edge portion is provided outside the frame and outside the tubular portion, and a gap formed between a peripheral edge portion of the notch that is adjacent to the first opening peripheral edge portion in the tubular wall of the tubular portion and an end portion of the notch closing portion that is adjacent to the first opening peripheral edge portion is provided more adjacent to the second opening peripheral edge portion than the end surface of the protruding block portion in a tube axis direction of the tubular portion.

2. The electrical connection box according to claim 1, wherein the block is a wall surface disposed to face the peripheral edge portion of the notch in the tubular portion, and has a facing wall surface extending toward the first opening peripheral edge portion by a creepage distance from the gap.

3. The electrical connection box according to claim 2, wherein the first cover member includes a cover main body that is disposed to face the one opening of the tubular portion, an annular outer peripheral wall body that covers the first opening peripheral edge portion from the outside of the tubular portion, a closing wall body that closes a gap between the cover main body and the outer peripheral wall body, an annular inner peripheral wall body that is disposed at an interval from the outer peripheral wall body on an inner side of the outer peripheral wall body and is fitted to the first opening peripheral edge portion, and a waterproof cover wall body that protrudes from the outer peripheral wall body to a position where the gap and the power-supply-side electrical connection structure are covered between the waterproof cover wall body and the tubular wall of the tubular portion.

4. The electrical connection box according to claim 1, wherein in the block, an installation surface on which the electronic component inserted from the first opening peripheral edge portion is mounted is provided more adjacent to the first opening peripheral edge portion than the gap.

5. The electrical connection box according to claim 4, wherein the first cover member includes a cover main body that is disposed to face the one opening of the tubular portion, an annular outer peripheral wall body that covers the first opening peripheral edge portion from the outside of the tubular portion, a closing wall body that closes a gap between the cover main body and the outer peripheral wall body, an annular inner peripheral wall body that is disposed at an interval from the outer peripheral wall body on an inner side of the outer peripheral wall body and is fitted to the first opening peripheral edge portion, and a waterproof cover wall body that protrudes from the outer peripheral wall body to a position where the gap and the power-supply-side electrical connection structure are covered between the waterproof cover wall body and the tubular wall of the tubular portion.

6. The electrical connection box according to claim 1, wherein the frame is a tubular portion having openings at both ends and bulging from the tubular wall of the tubular portion toward the outside of the frame outside the tubular portion, and includes a sub tubular portion of which an inside communicates with the inside of the tubular portion via the notch and in which the protruding block portion and the power-supply-side electrical connection structure are disposed, and one opening of the sub tubular portion that is adjacent to the first opening peripheral edge portion is provided more adjacent to the first opening peripheral edge portion than the gap.

7. The electrical connection box according to claim 6, wherein the second cover member has a closing portion that closes the other opening of the sub tubular portion that is adjacent to the second opening peripheral edge portion.

8. The electrical connection box according to claim 7, wherein the first cover member includes a cover main body that is disposed to face the one opening of the tubular portion, an annular outer peripheral wall body that covers the first opening peripheral edge portion from the outside of the tubular portion, a closing wall body that closes a gap between the cover main body and the outer peripheral wall body, an annular inner peripheral wall body that is disposed at an interval from the outer peripheral wall body on an inner side of the outer peripheral wall body and is fitted to the first opening peripheral edge portion, and a waterproof cover wall body that protrudes from the outer peripheral wall body to a position where the gap and the power-supply-side electrical connection structure are covered between the waterproof cover wall body and the tubular wall of the tubular portion.

9. The electrical connection box according to claim 6, wherein the first cover member includes a cover main body that is disposed to face the one opening of the tubular portion, an annular outer peripheral wall body that covers the first opening peripheral edge portion from the outside of the tubular portion, a closing wall body that closes a gap between the cover main body and the outer peripheral wall body, an annular inner peripheral wall body that is disposed at an interval from the outer peripheral wall body on an inner side of the outer peripheral wall body and is fitted to the first opening peripheral edge portion, and a waterproof cover wall body that protrudes from the outer peripheral wall body to a position where the gap and the power-supply-side electrical connection structure are covered between the waterproof cover wall body and the tubular wall of the tubular portion.

10. The electrical connection box according to claim 1, wherein the first cover member includes a cover main body that is disposed to face the one opening of the tubular portion, an annular outer peripheral wall body that covers the first opening peripheral edge portion from the outside of the tubular portion, a closing wall body that closes a gap between the cover main body and the outer peripheral wall body, an annular inner peripheral wall body that is disposed at an interval from the outer peripheral wall body on an inner side of the outer peripheral wall body and is fitted to the first opening peripheral edge portion, and a waterproof cover wall body that protrudes from the outer peripheral wall body to a position where the gap and the power-supply-side electrical connection structure are covered between the waterproof cover wall body and the tubular wall of the tubular portion.

* * * * *